(12) United States Patent
Wakabayashi et al.

(10) Patent No.: US 12,491,908 B2
(45) Date of Patent: Dec. 9, 2025

(54) VEHICLE CONTROL APPARATUS

(71) Applicant: Mitsubishi Electric Corporation, Tokyo (JP)

(72) Inventors: Mizuho Wakabayashi, Tokyo (JP); Yuko Omagari, Tokyo (JP); Yusuke Matsuo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1 day.

(21) Appl. No.: 18/611,147

(22) Filed: Mar. 20, 2024

(65) Prior Publication Data
US 2024/0400090 A1 Dec. 5, 2024

(30) Foreign Application Priority Data

May 29, 2023 (JP) ................................. 2023-087487

(51) Int. Cl.
*B60W 30/18* (2012.01)
*B60W 30/14* (2006.01)
*B60W 60/00* (2020.01)

(52) U.S. Cl.
CPC ........ *B60W 60/001* (2020.02); *B60W 30/146* (2013.01); *B60W 30/18009* (2013.01); *B60W 60/0053* (2020.02); *B60W 2520/10* (2013.01); *B60W 2555/60* (2020.02)

(58) Field of Classification Search
CPC ............. B60W 60/001; B60W 30/146; B60W 30/18009; B60W 60/0053; B60W 2520/10; B60W 2555/60; B60W 50/0097; B60W 30/143; B60W 2720/10; B60W 2720/103
See application file for complete search history.

(56) References Cited

U.S. PATENT DOCUMENTS

2017/0320521 A1   11/2017   Fujita
2020/0189586 A1    6/2020   Choi et al.

FOREIGN PATENT DOCUMENTS

| JP | 2004-142686 A |   | 5/2004  |              |
|----|---------------|---|---------|--------------|
| JP | 3714164       | * | 11/2005 | ... B60L 7/14 |
| JP | 3714164 B2    | * | 11/2005 | ... B60L 7/14 |
| JP | 6323565 B2    |   | 5/2018  |              |

OTHER PUBLICATIONS

Communication issued Oct. 28, 2025 in Japanese Patent Application No. 2023-087487.

* cited by examiner

*Primary Examiner* — Brodie J Follman
(74) *Attorney, Agent, or Firm* — Sughrue Mion, PLLC

(57) ABSTRACT

To provide a vehicle control apparatus which performs deceleration stepwisely according to the traveling state of the ego vehicle, and can reduce the uncomfortable feeling to the occupant, and the discomfort to the following vehicle. A vehicle control apparatus sets a deceleration point and a deceleration point speed on a target travel route, and sets a preliminary deceleration completion point between a present position of an ego vehicle, and the deceleration point; sets a preliminary deceleration completion speed; and sets the preliminary deceleration completion point and a preliminary deceleration completion speed so that an absolute value of deceleration of a preliminary deceleration interval is smaller than an absolute value of deceleration of a final deceleration interval.

12 Claims, 12 Drawing Sheets

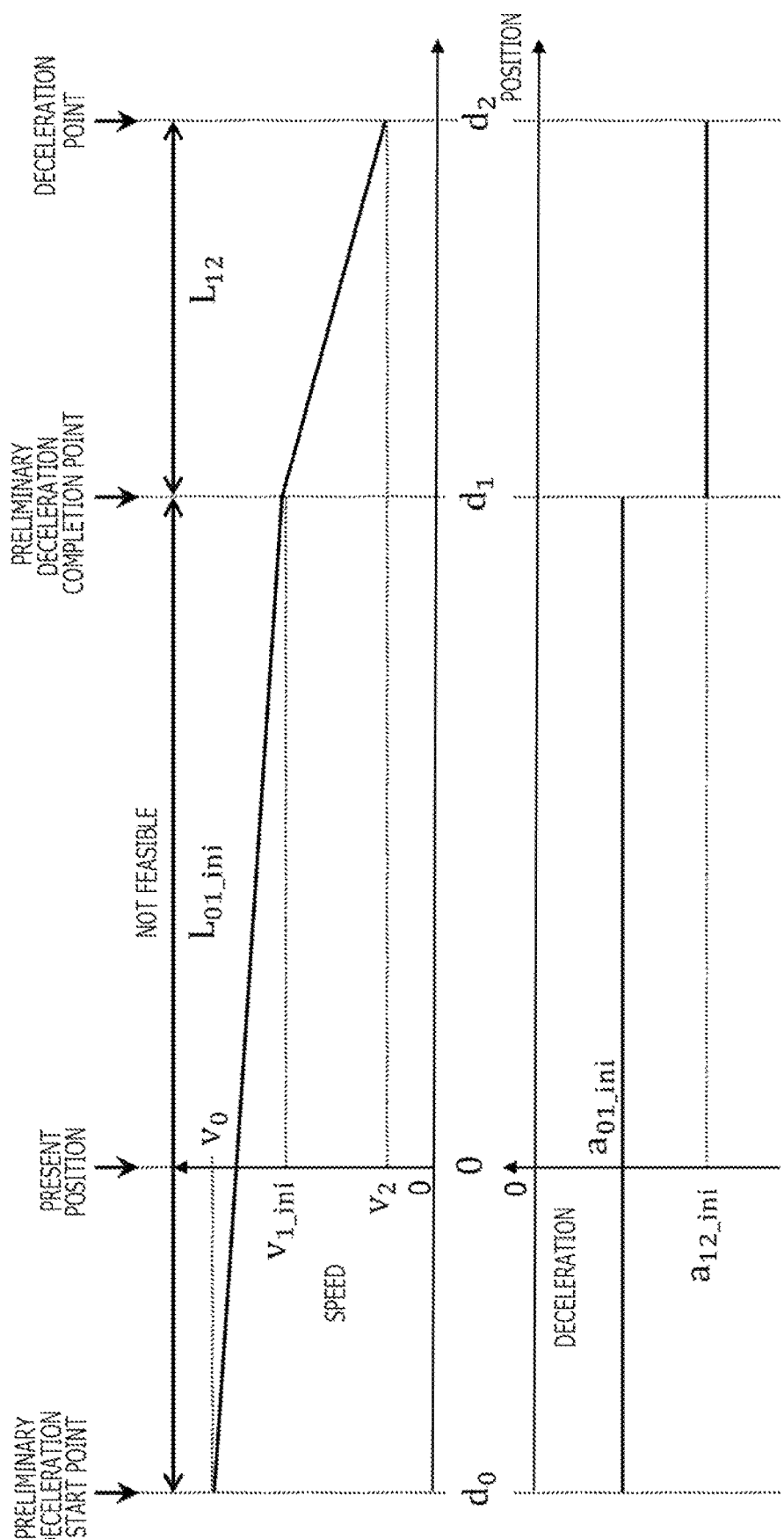

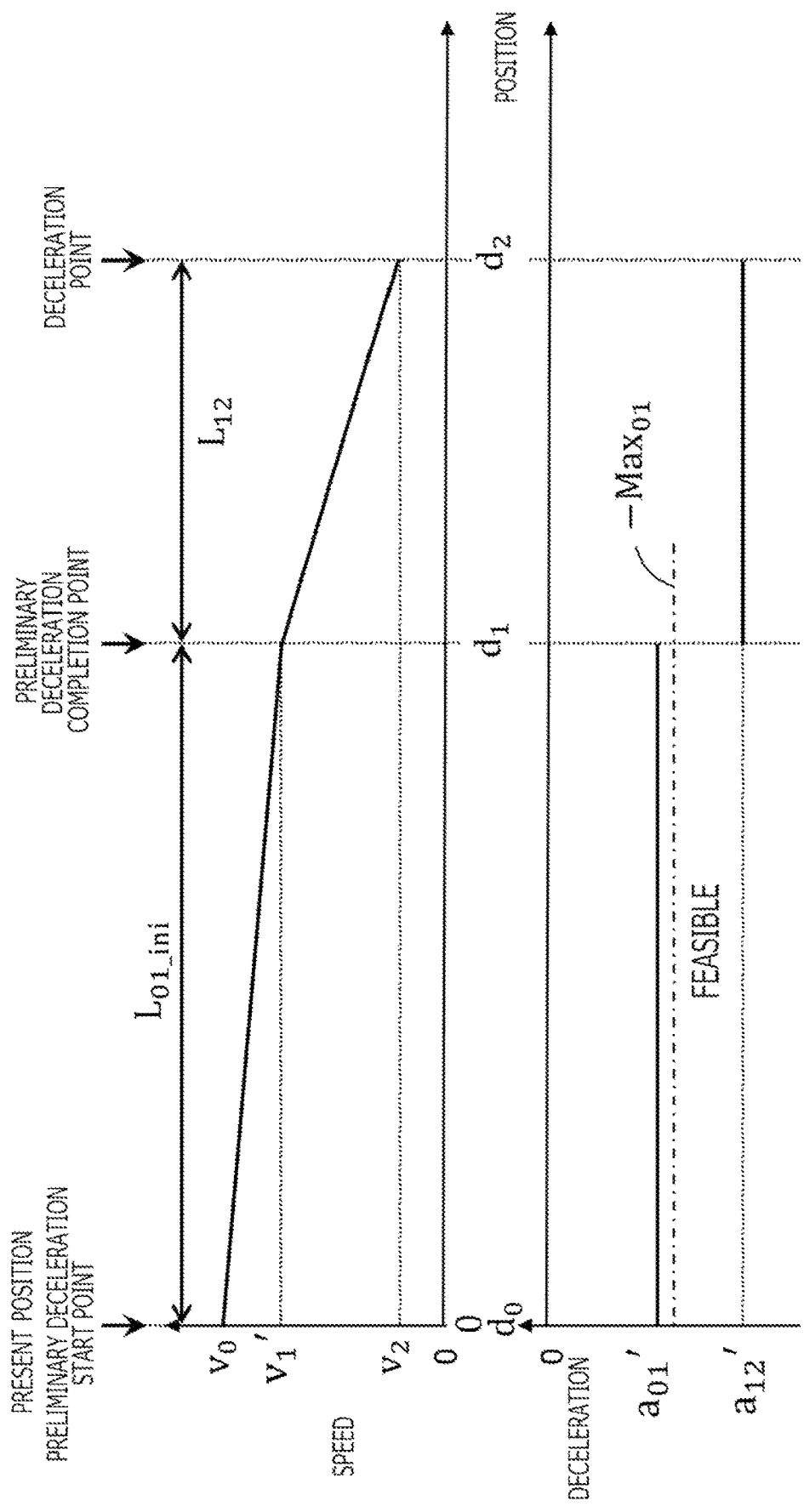
FIG. 9 CALCULATION OF SOLUTION AFTER RECALCULATION: WHEN $v_0 = 100 km/h$

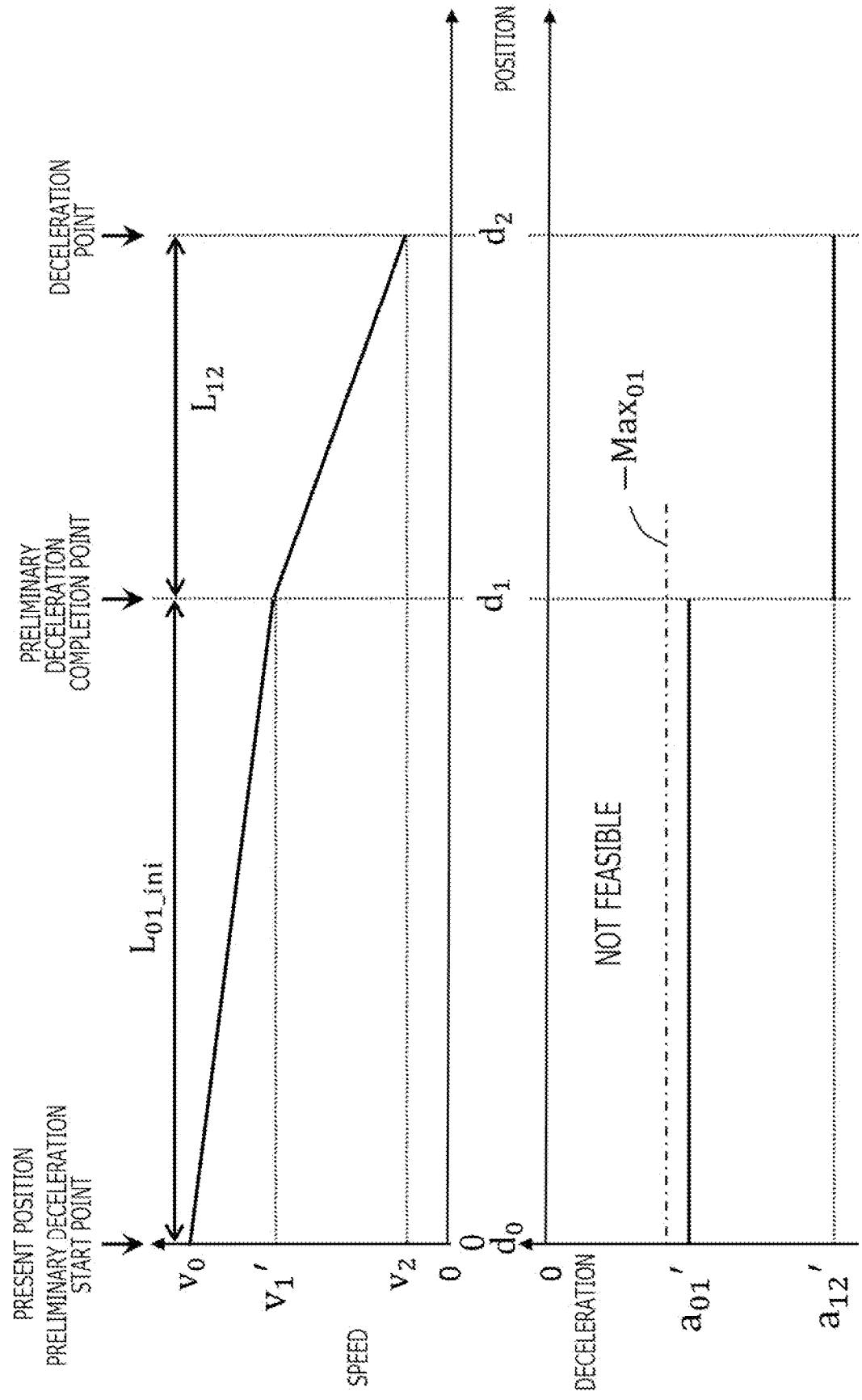
FIG. 10 CALCULATION OF SOLUTION AFTER RECALCULATION: WHEN $v_0 = 120 km/h$

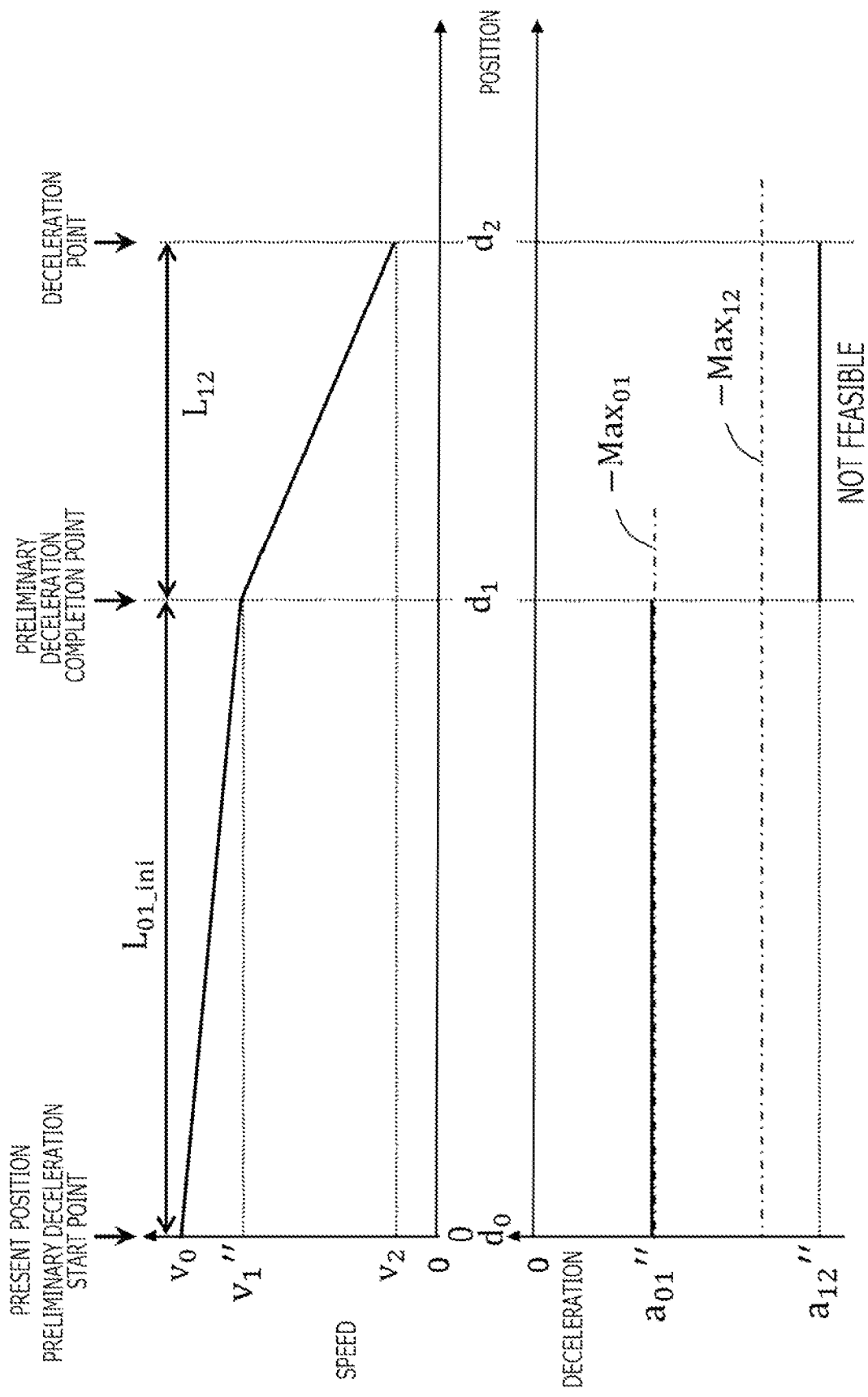

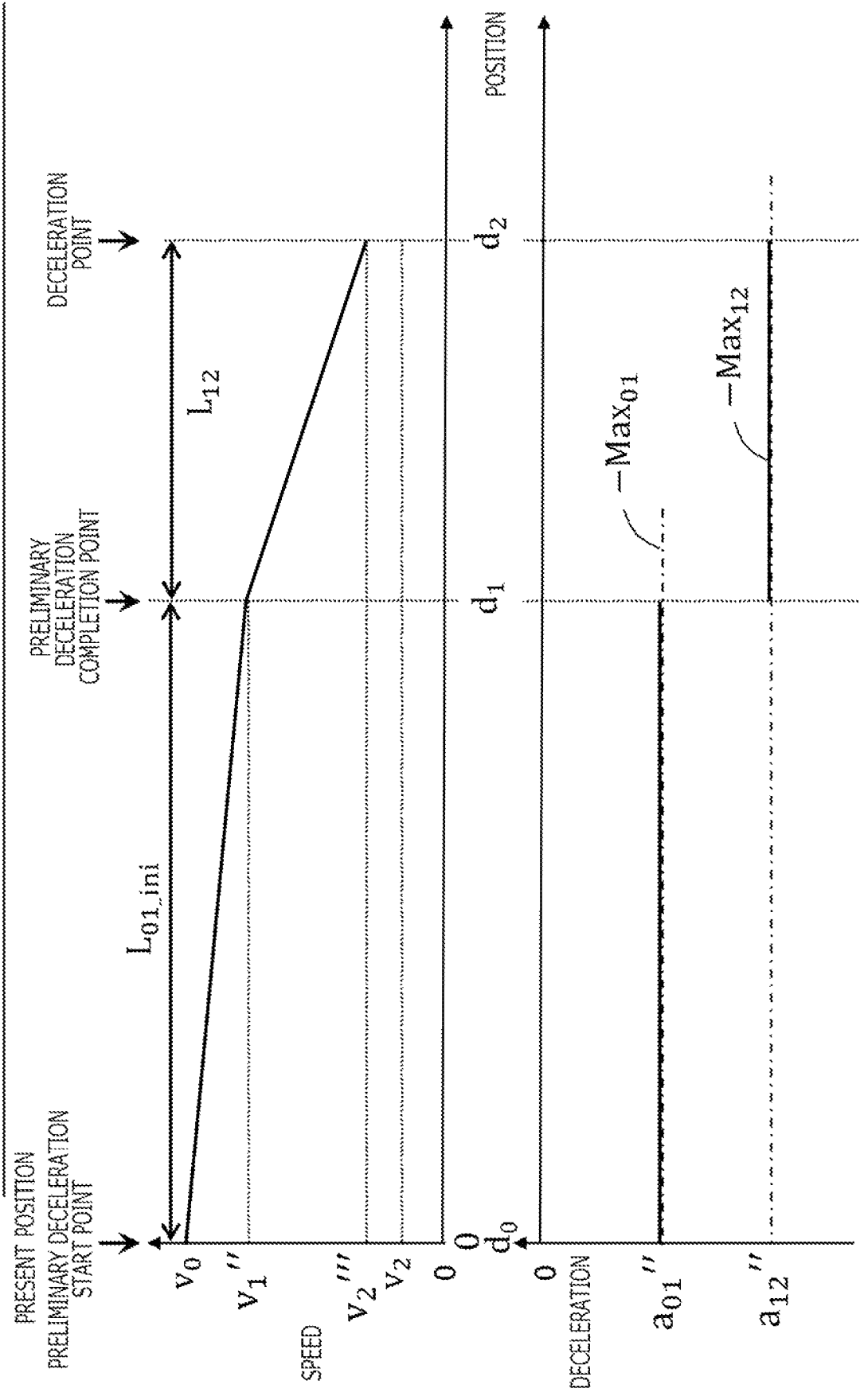
FIG. 12 CALCULATION OF SOLUTION AFTER FOURTH TIME CALCULATION: WHEN $v_0 = 120km/h$

VEHICLE CONTROL APPARATUS

INCORPORATION BY REFERENCE

The disclosure of Japanese Patent Application No. 2023-087487 filed on May 29, 2023 including its specification, claims and drawings, is incorporated herein by reference in its entirety.

BACKGROUND

The present disclosure relates to a vehicle control apparatus.

In the driving support technology, a vehicle control apparatus has been proposed that performs the automatic control of the travelling speed appropriately according to a change in a speed at which the ego vehicle should travel, such as a change in the limit speed, in order to reduce the burden on the driver.

For example, in JP 6323565 B, a lane change point where the ego vehicle must change lanes, and a reference point located after the lane change part are set, a speed at which the ego vehicle should travel at a lane change completion point is estimated, based on a distance from the lane change completion point to a reference point, and a deceleration from the lane change completion point to the reference point; and sudden deceleration after the lane change is prevented by decelerating beforehand, before reaching at the lane change completion point.

SUMMARY

However, in the technology of JP 6323565 B, since the speed where the ego vehicle should travel at the lane change completion point is estimated based on the distance from the lane change completion point to the reference point, and the deceleration from the lane change completion point to the reference point, depending on the traveling state before the lane change (the travelling speed and a distance from the present position to the lane change completion point), sudden deceleration may occur by a deceleration from the present position to the lane change completion point. In this way, when the sudden deceleration occurs before the lane change, uncomfortable feeling will be given to the occupant or discomfort will be given to the following vehicle.

Then, the purpose of the present disclosure is to provide a vehicle control apparatus which performs deceleration stepwisely according to the traveling state of the ego vehicle, and can reduce the uncomfortable feeling to the occupant, and the discomfort to the following vehicle.

A vehicle control apparatus according to the present disclosure, including:
- an information acquisition unit that acquires a traveling state of an ego vehicle, and road information around the ego vehicle;
- a target travel route setting unit that sets a target travel route of the ego vehicle;
- a deceleration point setting unit that sets a deceleration point which is a point where a speed at which the ego vehicle should travel is less than a present travelling speed of the ego vehicle, on the target travel route, based on the traveling state, the target travel route, and the road information, and sets a deceleration point speed which is a speed at which the ego vehicle should travel at the deceleration point;
- a preliminary deceleration setting unit that sets a preliminary deceleration completion point which is a point where a preliminary deceleration of the ego vehicle is completed between the present position of the ego vehicle and the deceleration point, on the target travel route; and sets a preliminary deceleration completion speed which is a speed at which the ego vehicle should travel at the preliminary deceleration completion point;
- a target traveling state setting unit that sets a target traveling state based on the preliminary deceleration completion point, the preliminary deceleration completion speed, the deceleration point, and the deceleration point speed; and
- a vehicle control unit that controls the ego vehicle based on the target traveling state,
- wherein the preliminary deceleration setting unit sets the preliminary deceleration completion point and the preliminary deceleration completion speed so that an absolute value of a deceleration of a preliminary deceleration interval from a start point of the preliminary deceleration to the preliminary deceleration completion point is smaller than an absolute value of a deceleration of a final deceleration interval from the preliminary deceleration completion point to the deceleration point.

The vehicle control apparatus according to the present disclosure, from the present travelling speed to the deceleration point speed at the deceleration point, the ego vehicle can be systematically decelerated by two-step decelerations of the preliminary deceleration and the final deceleration. At this time, since the preliminary deceleration completion point and the preliminary deceleration completion speed are set so that the absolute value of the deceleration of the preliminary deceleration interval is smaller than the absolute value of the deceleration of the final deceleration interval, the deceleration that the absolute value of deceleration becomes large stepwisely is performed. Accordingly, smooth deceleration can be achieved, sudden deceleration can be prevented from giving uncomfortable feeling to the occupants or giving discomfort to the following vehicle, and comfort can be improved.

BRIEF DESCRIPTION OF THE DRAWINGS

FIG. 8 is a figure for explaining the calculation of the initial solution without feasibility according to Embodiment 1;

FIG. 9 is a figure for explaining the calculation of the solution after recalculation with feasibility according to Embodiment 1;

FIG. 10 is a figure for explaining the calculation of the solution after recalculation without feasibility according to Embodiment 1;

FIG. 11 is a figure for explaining the calculation of the solution after third time calculation without feasibility according to Embodiment 1; and FIG. 12 is a figure for explaining the calculation of the solution after fourth time calculation according to Embodiment 1.

DETAILED DESCRIPTION OF THE EMBODIMENTS

1. Embodiment 1

The vehicle control apparatus 50 according to Embodiment 1 will be explained with reference to drawings. In the present embodiment, the vehicle control apparatus 50 is provided in the ego vehicle.

Figure 1:
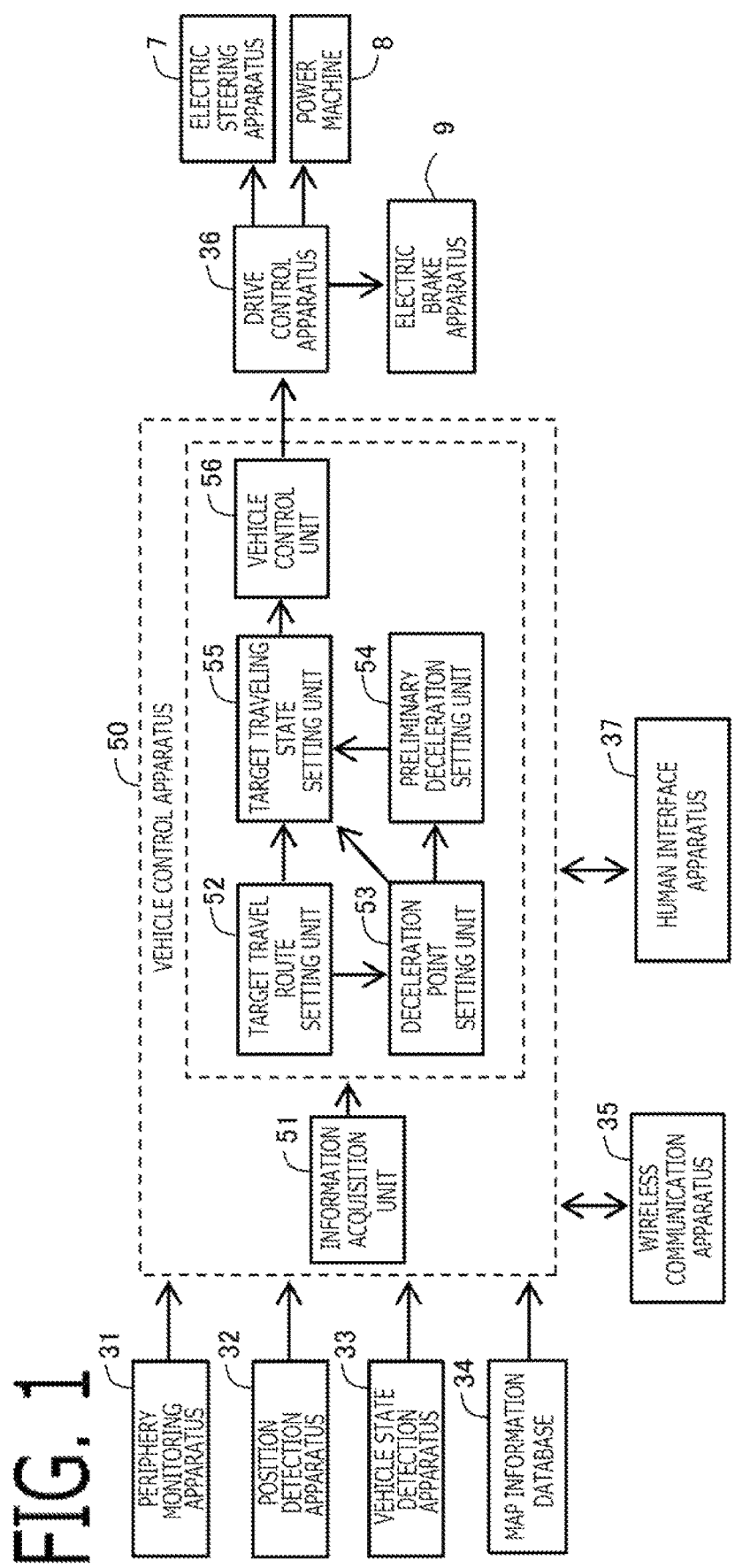
FIG. 1 is a schematic block diagram of the vehicle control apparatus and the vehicle control system according to Embodiment 1.

As shown in FIG. 1, the ego vehicle is provided with a periphery monitoring apparatus 31, a position detection apparatus 32, a vehicle state detection apparatus 33, a map information database 34, a wireless communication apparatus 35, a vehicle control apparatus 50, a drive control apparatus 36, a power machine 8, an electric steering apparatus 7, an electric brake apparatus 9, a human interface apparatus 37, and the like.

The periphery monitoring apparatus 31 is an apparatus which monitors the periphery of vehicle, such as a camera and a radar. As the radar, a millimeter wave radar, a laser radar, an ultrasonic radar, and the like are used. The wireless communication apparatus 35 performs a wireless communication with a base station, using the wireless communication standard of cellular communication system, such as 4G and 5G.

The position detecting apparatus 32 is an apparatus which detects the present position (latitude, longitude, altitude) of the ego vehicle, and a GPS antenna which receives the signal outputted from satellites, such S GNSS (Global Navigation Satellite System), is used. For detection of the present position of the ego vehicle, various kinds of methods, such as the method using the traveling lane identification number of the ego vehicle, the map matching method, the dead reckoning method, and the method using the detection information around the ego vehicle, may be used.

In the map information database 34, road information, such as a road shape (for example, a lane number, a position of each lane, a shape of each lane, a type of each lane, a road type, a limit speed, and the like), a road sign (a limit speed sign and its limit speed, a stop sign, and the like), a tollgate (an entrance position of tollgate, a passing speed of tollgate, and the like), and a traffic signal, is stored. The map information database 34 is mainly constituted of a storage apparatus. The map information database 34 may be provided in a server outside the vehicle connected to the network, and the vehicle control apparatus 50 may acquire required road information from the server outside the vehicle via the wireless communication apparatus 35.

As the drive control apparatus 36, a power controller, a brake controller, an automatic steering controller, a light controller, and the like are provided. The power controller controls an output of a power machine 8, such as an internal combustion engine and a motor. The brake controller controls a brake operation of the electric brake apparatus 9. The automatic steering controller controls the electric steering apparatus 7. The light controller controls a direction indicator, a hazard lamp, and the like.

The vehicle condition detection apparatus 33 is a detection apparatus which detects an ego vehicle state which is a driving state and a traveling state of the ego vehicle. In the present embodiment, the vehicle state detection apparatus 33 detects a speed, an acceleration, a yaw rate, a steering angle, a lateral acceleration and the like of the ego vehicle, as the traveling state of the ego vehicle. For example, as the vehicle state detection apparatus 33, a speed sensor which detects a rotational speed of wheels, an acceleration sensor, an angular speed sensor, a steering angle sensor, and the like are provided.

As the driving state of the ego vehicle, an acceleration or deceleration operation, a steering angle operation, and a lane change operation by a driver are detected. For example, as the vehicle state detection apparatus 33, an accelerator position sensor, a brake position sensor, a steering angle sensor (handle angle sensor), a steering torque sensor, a direction indicator position switch, and the like are provided.

The human interface apparatus 37 is an apparatus which receives input of the driver or transmits information to the driver, such as a loudspeaker, a display screen, an input device, and the like.

1-1. Vehicle Control Apparatus 50

Figure 2:
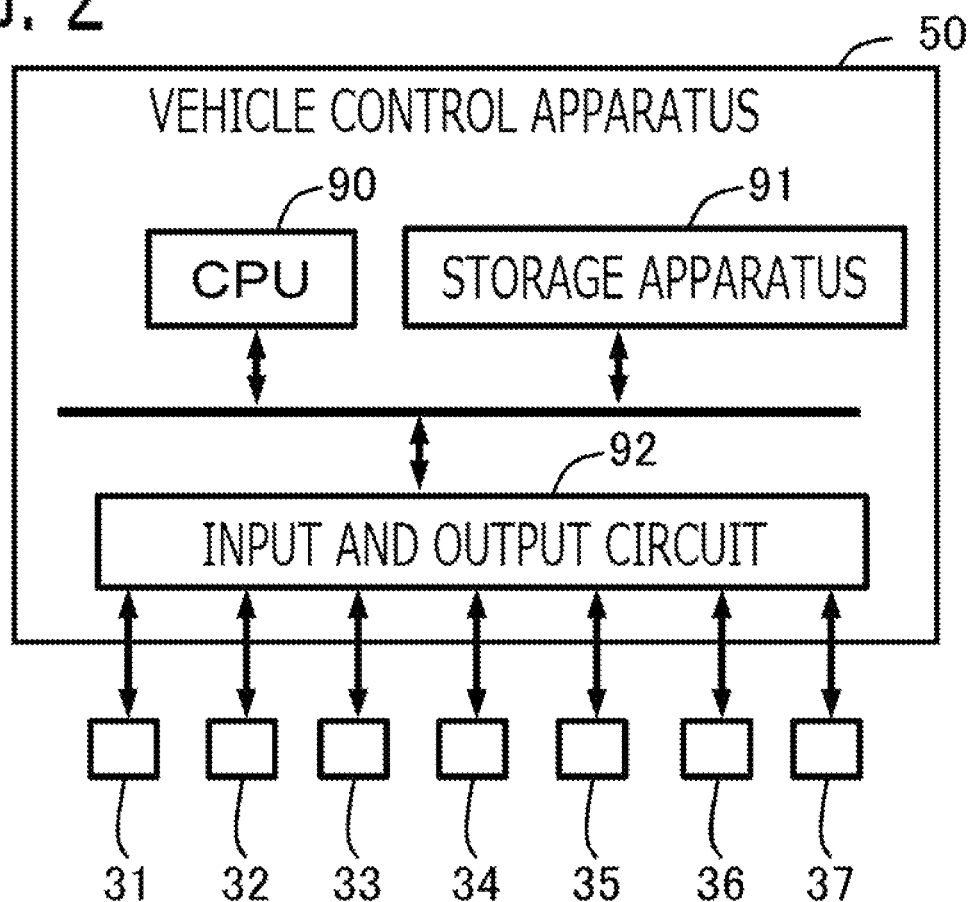
FIG. 2 is a schematic hardware configuration diagram of the vehicle control apparatus according to Embodiment 1.

The vehicle control apparatus 50 is provided with processing units of an information acquisition unit 51, a target travel route setting unit 52, a deceleration point setting unit 53, a preliminary deceleration setting unit 54, a target traveling state setting unit 55, a vehicle control unit 56, and the like. Each processing of the vehicle control apparatus 50 is realized by processing circuits provided in the vehicle control apparatus 50. As shown in FIG. 2, specifically, the vehicle control apparatus 50 is provided with an arithmetic processor 90 such as CPU (Central Processing Unit), storage apparatuses 91, an input and output circuit 92 which outputs and inputs external signals to the arithmetic processor 90, and the like.

As the arithmetic processor 90, ASIC (Application Specific Integrated Circuit), IC (Integrated Circuit), DSP (Digital Signal Processor), FPGA (Field Programmable Gate Array), GPU (Graphics Processing Unit), AI (Artificial Intelligence) chip, various kinds of logical circuits, various kinds of signal processing circuits, and the like may be provided. As the arithmetic processor 90, a plurality of the same type ones or the different type ones may be provided, and each processing may be shared and executed. As the storage apparatuses 91, various kinds of storage apparatuses, such as RAM (Random Access Memory), ROM (Read Only Memory), a flash memory, EEPROM (Electrically Erasable Programmable Read Only Memory), and a hard disk, are used.

The input and output circuit 92 is provided with a communication device, an A/D converter, an input/output port, a driving circuit, and the like. The input and output circuit 92 is connected to the periphery monitoring apparatus 31, the position detection apparatus 32, the vehicle state detection apparatus 33, the map information database 34, the wireless communication apparatus 35, the drive control apparatus 36, and the human interface apparatus 37, and communicates with these devices.

Then, the arithmetic processor 90 runs software items (programs) stored in the storage apparatus 91 and collaborates with other hardware devices in the vehicle control apparatus 50, such as the storage apparatus 91, and the input and output circuit 92, so that the respective processings of the processing units 51 to 56 provided in the vehicle control apparatus 50 are realized. Setting data, such as an initial deceleration $a_{01\_ini}$ of the preliminary deceleration interval, an initial deceleration $a_{12\_ini}$ of the final deceleration interval, an upper limit value $Max_{01}$ of the preliminary deceleration interval, and an upper limit value $Max_{12}$ of the final deceleration interval, utilized in the processing units 51 to 56 are stored in the storage apparatus 91, such as EEPROM.

Figure 3:
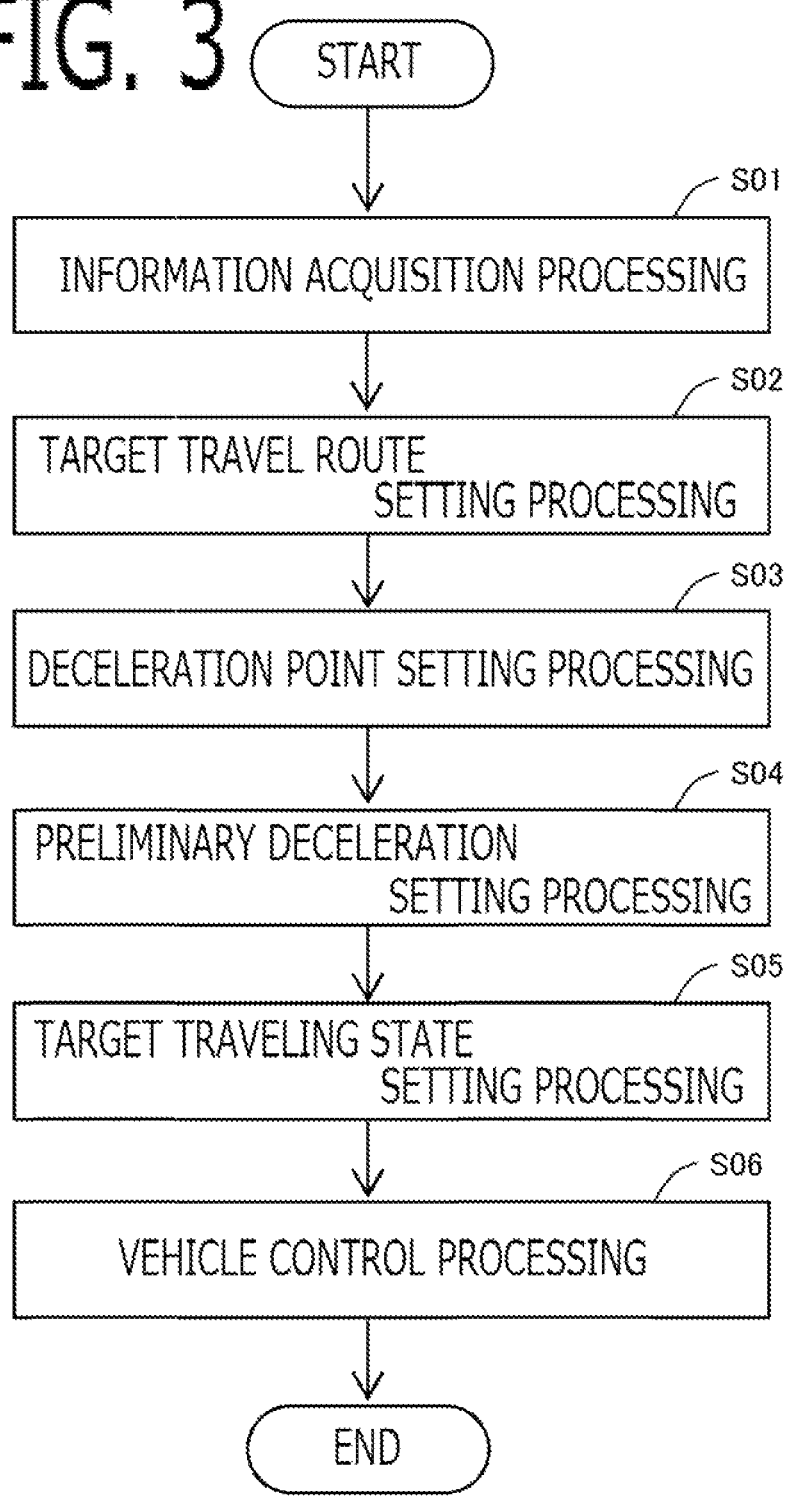
FIG. 3 is a flowchart for explaining schematic processing of the vehicle control apparatus according to Embodiment 1.

Hereinafter, each processing of the vehicle control apparatus 50 will be explained in detail, referring to the flowchart of FIG. 3. Processing of the flowchart of FIG. 3 is executed at every predetermined calculation period, for example. The processing of unnecessary step at the execution time point is skipped appropriately.

1-1-1. Information Acquisition Unit 51

In the step S01 of FIG. 3, the information acquisition unit 51 acquires a traveling state of the ego vehicle, and road information around the ego vehicle. In the present embodiment, the information acquisition unit 51 acquires information on other vehicle around the ego vehicle.

The information acquisition unit 51 acquires the traveling state of the ego vehicle. In the present embodiment, the information acquisition unit 51 acquires a position, a moving direction, a speed, an acceleration, and the like of the ego vehicle, based on position information of the ego vehicle acquired from the position detection apparatus 32, and the ego vehicle state acquired from the vehicle state detection apparatus 33.

The information acquisition unit 51 acquires road information around the ego vehicle from the map information database 34, based on the position information of the ego vehicle acquired from the position detection apparatus 32. The acquired road information includes the road shape (for example, the lane number, the position of each lane, the shape of each lane, the type of each lane, the road type, the limit speed, and the like), a road sign (the limit speed sign and its limit speed, the stop sign, and the like), the tollgate (the entrance position of tollgate, the passing speed of tollgate, and the like), and the traffic signal, and the like. The shape of each lane includes the center position of lane, the width of lane, the curvature of lane, and the like. The shape of lane is set at each point along the longitudinal direction of the lane. The type of each lane includes a main lane, a diversion lane which diverges from the main lane, and the like. The shape of lane includes a start position of the diversion lane, an end position of the diversion lane, and a length of the diversion lane. The diversion lane includes a deceleration lane for decelerating gradually after the diversion.

The information acquisition unit 51 detects a shape and a type of a lane marking and the like of the road, based on the detection information on the lane marking, such as a white line and a road shoulder, acquired from the periphery monitoring apparatus 31; and determines the shape and the position of each lane, the lane number, the type of each lane, and the like, based on the detected shape and the detected type of the lane marking of the road. The shape of each lane includes the center position of lane, the width of lane, the curvature of lane, and the like. The type of each lane includes the main lane, the diversion lane, and the like.

The information acquisition unit 51 acquires information on the road sign, the traffic signal, and the tollgate, based on the detection information acquired from the periphery monitoring apparatus 31. The information acquisition unit 51 may acquire the present state of the traffic signal and the like via the wireless communication from the outside.

The information acquisition unit 51 acquires information on other vehicle around the ego vehicle. In the present embodiment, the information acquisition unit 51 acquires a position, a moving direction, a speed, an acceleration, and the like of other vehicle, based on detection information acquired from the periphery monitoring apparatus 31, and position information of the ego vehicle acquired from the position detection apparatus 32. The information acquisition unit 51 also acquires information of an obstacle, a pedestrian, a traffic regulation such as lane regulation, and the like, other than other vehicle.

The information acquisition unit 51 may acquire the traveling state of other vehicle (the position, the moving direction, the speed, and the like of other vehicle), the road information (the lane information and the like), and the traffic information (the obstacle, the congestion degree, and the like) around the ego vehicle, from the outside of the ego vehicle by communication. For example, the information acquisition unit 51 may acquire the movement information of other vehicle, and the road information and the traffic information around the ego vehicle, from other vehicle or the server to which other vehicle uploaded information, by the wireless communication and the like. The information acquisition unit 51 may acquire the traveling state of other vehicle, the road information, the traffic information, and the like in a monitor area, from a roadside machine, such as a camera, which monitors the condition of the road, and the like, by the wireless communication and the like.

The information acquisition unit 51 acquires the lane information corresponding to a lane where the ego vehicle is traveling, based on the position of the ego vehicle. The information acquisition unit 51 acquires the lane information corresponding to a lane where each other vehicle is traveling, based on the position of each other vehicle. The acquired lane information includes the shape, the position, and the type of lane and the lane information of the peripheral lane.

1-1-2. Target Travel Route Setting Unit 52

In the step S02 of FIG. 3, the target travel route setting unit 52 sets a target travel route of the ego vehicle. For example, the target travel route setting unit 52 sets the target travel route from the present position of the ego vehicle to a target point, using road information. Since various well-known methods are used for setting of the target travel route, explanation is omitted. In the target travel route, a target lane where the ego vehicle travels, and the lane change position are set. For example, when moving from the main lane to the diversion lane, a range to travel in the main lane, a position to change lanes from the main lane to the diversion lane, a range to travel in the diversion lane, and the like are set.

1-1-3. Deceleration Point Setting Unit 53

In the step S03 of FIG. 3, the deceleration point setting unit 53 sets a deceleration point which is a point where a speed at which the ego vehicle should travel is less than the present travelling speed $V_0$ of the ego vehicle, on the target travel route, based on the traveling state of the ego vehicle, the target travel route, and the road information; and sets a deceleration point speed $V_2$ which is a speed at which the ego vehicle should travel at the deceleration point.

For example, the deceleration point setting unit 53 sets, as the deceleration point, a start position of an interval with a limit speed lower than the present travelling speed $V_0$ of the ego vehicle, on the target travel route; and sets the deceleration point speed $V_2$ based on the limit speed of the lane with the lower limit speed. The deceleration point setting unit 53 sets, as the deceleration point, a start position of setting a limit speed which is lower than the present travelling speed $V_0$ of the ego vehicle by a determination speed difference (for example, 30 km/h).

Figure 4:
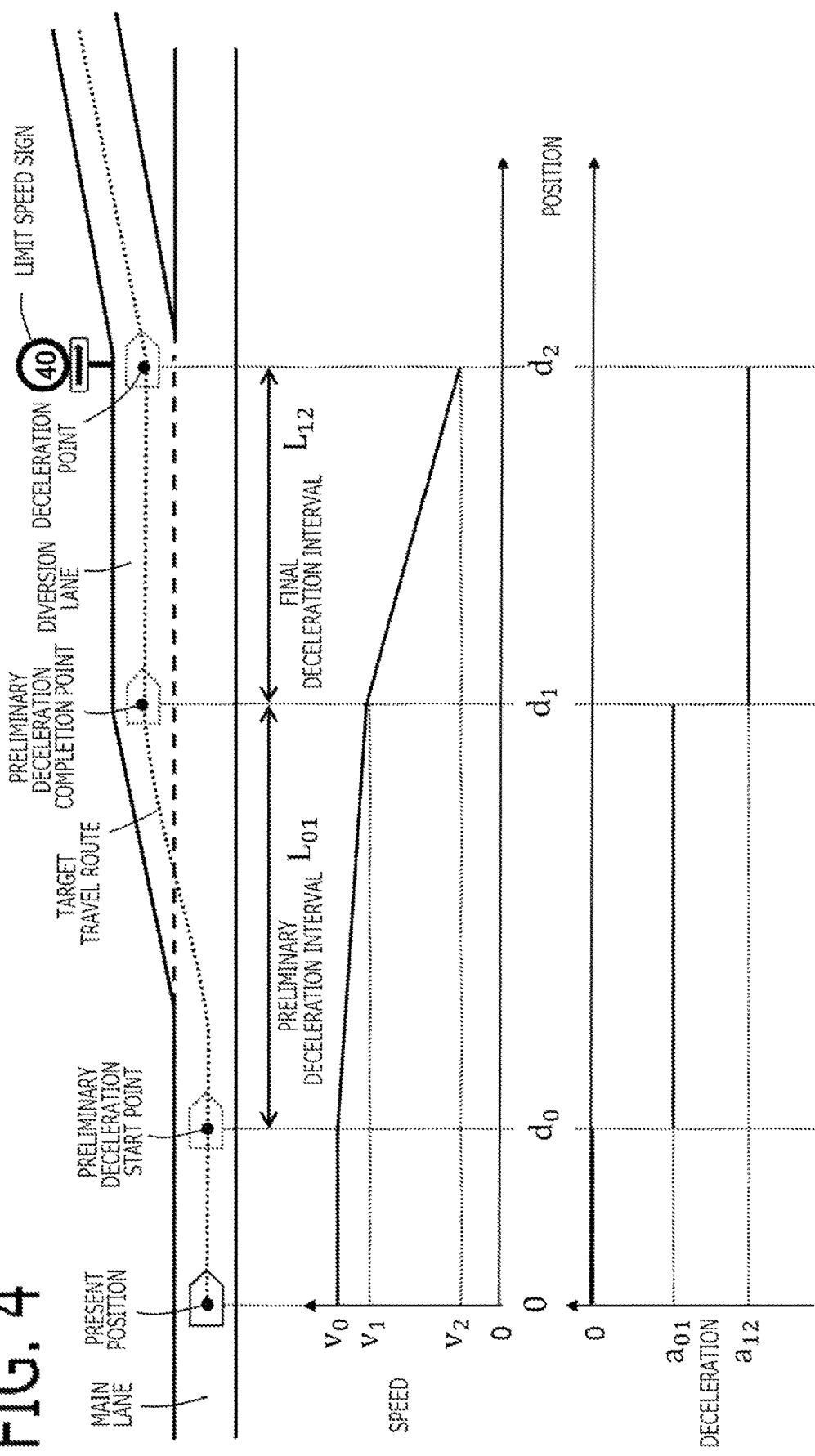
FIG. 4 is a figure for explaining the processing in the diversion lane according to Embodiment 1.

In the present embodiment, as shown in the example of FIG. 4, the deceleration point setting unit 53 set, as the deceleration point, a position of a limit speed sign which starts an interval of a limit speed lower than the present travelling speed $V_0$ of the ego vehicle, on the target travel route; and sets the deceleration point speed $V_2$ based on the limit speed of the limit speed sign. The deceleration point setting unit 53 may set, as the deceleration point, a position of the limit speed sign which starts an interval of the low limit speed which is lower than the present travelling speed $V_0$ of the ego vehicle by the determination speed difference (for example, 30 km/h).

When a tollgate which requires deceleration exists on the target travel route, the deceleration point setting unit 53 sets an entrance of the tollgate as the deceleration point; and sets a passing speed of the tollgate as the deceleration point speed $V_2$. The tollgate which requires deceleration includes the tollgate where toll is automatically paid without stopping by wireless communication with onboard equipment (for example, ETC (Electronic Toll Collection System)). When the passing speed of the tollgate is specified, its passing speed (for example, 20 km/h) is set as the deceleration point speed $V_2$. The tollgate which requires deceleration includes the tollgate where toll is paid to a payment machine or staff or a traffic ticket is received after stopping. When the vehicle stop is specified, the deceleration point speed $V_2$ is set to 0 km/h. Not only the tollgate of road, but also various tollgates, such as a tollgate of parking place and a tollgate of facility, may be included.

When the stop sign or the red light is detected on the target travel route, the deceleration point setting unit 53 sets a position before a stop position of a stop line or a front vehicle as the deceleration point, and sets the deceleration point speed $V_2$ to 0 km/h.

When a stopping vehicle is detected in front of the ego vehicle on the target travel route, the deceleration point setting unit 53 sets a position before the stopping vehicle (for example, position 5 meter before the stopping vehicle) as the deceleration point, and sets the deceleration point speed $V_2$ to 0 km/h. When there is the obstacle, the pedestrian, or the like, other than the front vehicle, a position which requires deceleration or stop may be set as the deceleration point.

1-1-4. Preliminary Deceleration Setting Unit 54

In the step S04 of FIG. 3, the preliminary deceleration setting unit 54 sets a preliminary deceleration completion point which is a point where a preliminary deceleration of the ego vehicle is completed between the present position of the ego vehicle and the deceleration point, on the target travel route; and sets a preliminary deceleration completion speed $V_1$ which is a speed at which the ego vehicle should travel at the preliminary deceleration completion point. The preliminary deceleration setting unit 54 sets the preliminary deceleration completion point and the preliminary deceleration completion speed $V_1$ so that an absolute value of a deceleration $a_{01}$ of a preliminary deceleration interval from a start point of the preliminary deceleration to the preliminary deceleration completion point is smaller than an absolute value of a deceleration $a_{12}$ of a final deceleration interval from the preliminary deceleration completion point to the deceleration point.

In the present disclosure, the deceleration means a negative acceleration and is a negative value.

According to this configuration, from the present travelling speed to the deceleration point speed at the deceleration point, the ego vehicle can be systematically decelerated by two-step decelerations of the preliminary deceleration and the final deceleration. At this time, since the preliminary deceleration completion point and the preliminary deceleration completion speed $V_1$ are set so that the absolute value of the deceleration $a_{01}$ of the preliminary deceleration interval is smaller than the absolute value of the deceleration $a_{12}$ of the final deceleration interval, the deceleration that the absolute value of deceleration becomes large stepwisely is performed. Accordingly, smooth deceleration can be achieved, sudden deceleration can be prevented from giving uncomfortable feeling to the occupants or giving discomfort to the following vehicle, and comfort can be improved.

Although the setting processing of the preliminary deceleration completion point and the preliminary deceleration completion speed $V_1$ are performed before the ego vehicle starts the preliminary deceleration, the setting processing may be performed continuously in order to reflect the present state even after the ego vehicle starts the preliminary deceleration.

Figure 5:
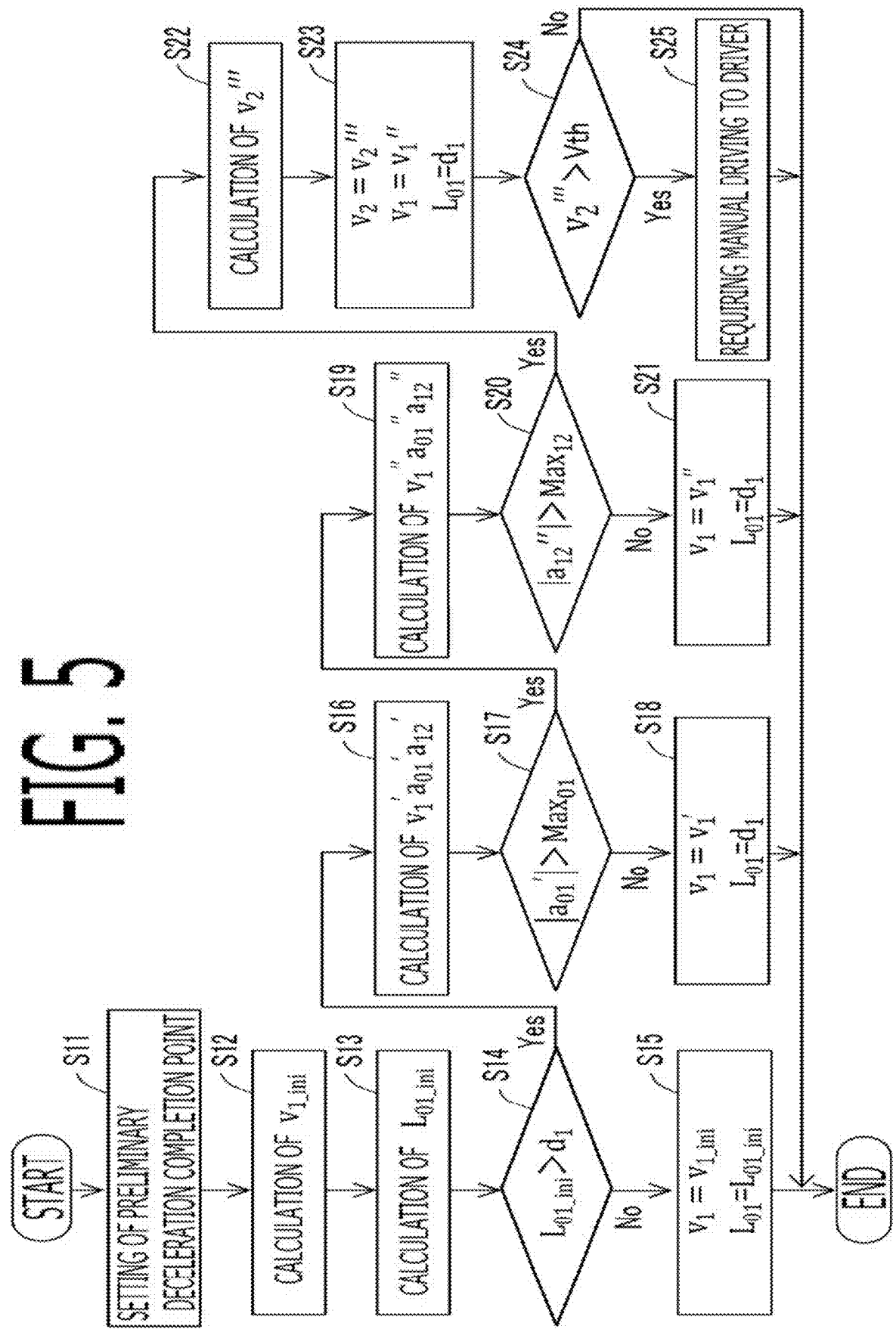
FIG. 5 is a flowchart for explaining processing of the preliminary deceleration setting unit and the like according to Embodiment 1.

Hereinafter, processing of the preliminary deceleration setting unit 54 and the like will be explained with reference to the flowchart of FIG. 5. Although explanation will be done using an example where the deceleration point is set after the diversion lane, it can be applied to also a case where the deceleration point is set to points other than after the diversion lane.

1-1-4-1. Setting of Preliminary Deceleration Completion Point

In the step S11, the preliminary deceleration setting unit 54 sets the preliminary deceleration completion point which is a point where the preliminary deceleration of the ego vehicle is completed between the present position of the ego vehicle and the deceleration point, on the target travel route.

For example, the preliminary deceleration setting unit 54 sets the preliminary deceleration completion point to a position before the deceleration point by a prescribed distance (for example, 50 meters), on the target travel route. The prescribed distance becomes a distance of the final deceleration interval.

Figure 6:
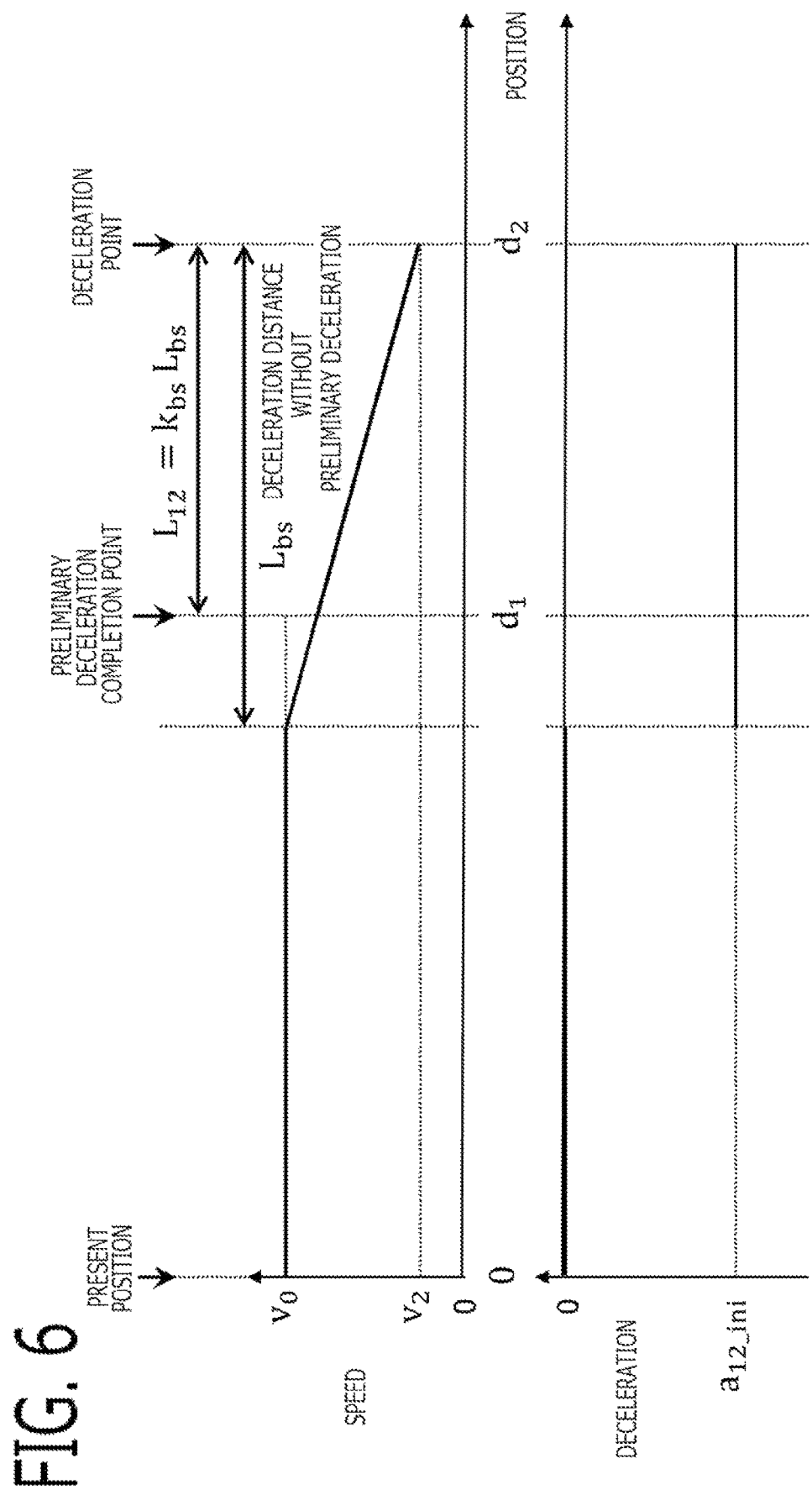
FIG. 6 is a figure for explaining setting of the preliminary deceleration completion point according to Embodiment 1.

Alternatively, as shown in FIG. 6, the preliminary deceleration setting unit 54 may calculate a deceleration distance $L_{bs}$ required to decelerate from the present travelling speed $V_0$ to the deceleration point speed $V_2$ in a state where the preliminary deceleration is not performed; and set a distance shorter than the deceleration distance $L_{bs}$ without the preliminary deceleration, as the distance $L_{12}$ of the final deceleration interval; set the preliminary deceleration completion point to a position before the deceleration point by the distance $L_{12}$ of the final deceleration interval. As shown in the next equation, the preliminary deceleration setting unit 54 calculates the deceleration distance $L_{bs}$ without the preliminary deceleration, based on the present travelling speed $V_0$, the deceleration point speed $V_2$, and an initial deceleration $a_{12\_ini}$ of the final deceleration interval. A value obtained by multiplying a coefficient $K_{bs}$ less than 1 (for example, 0.8) to the deceleration distance $L_{bs}$ without the preliminary deceleration is set as the distance $L_{12}$ of the final deceleration interval. Then, the preliminary deceleration setting unit 54 sets the preliminary deceleration completion point to a position before the deceleration point by the distance $L_{12}$ of the final deceleration interval.

[Math. 1]

$$L_{bs} = \frac{v_2^2 - v_0^2}{2a_{12\_ini}} \quad (1)$$

$$L_{12} = K_{bs} L_{bs}$$

<Setting in Diversion Lane>

Alternatively, as shown in FIG. 4, when the diversion lane which diverges from the main lane the exists on the target travel route, the preliminary deceleration setting unit 54 sets the preliminary deceleration completion point after the start point of the diversion lane.

According to this configuration, it can prevent that a large deceleration due to the deceleration of the final deceleration interval is performed in the main lane, and it can prevent the disturbance of driving of the following vehicle in the main lane.

For example, the start point of the diversion lane may be set at the end position of a taper part where the diversion lane expands gradually. The diversion lane may include a deceleration lane for decelerating gradually after the diversion. It is assumed that the limit speed is not changed in the deceleration lane, and the limit speed is decreased after the end of the deceleration lane.

For even other than the diversion lane, the preliminary deceleration completion point may be set in accordance with the road shape before the deceleration point. For example, the preliminary deceleration completion point is set within an interval where the deceleration may be performed.

<Start of Preliminary Deceleration by Operation of Direction Indicator>

When an operation of the direction indicator by the driver is detected in a case where the lane change is required in an interval before reaching at the deceleration point, the preliminary deceleration setting unit 54 sets the preliminary deceleration completion point and the preliminary deceleration completion speed $V_1$, and starts the preliminary deceleration. For example, this can be applied to when the lane change from the main lane to the diversion lane is performed.

When the driver ignores the target travel route and the lane change is not performed, it is not necessary to decelerate since the ego vehicle will not pass through the deceleration point. According to the above configuration, since the preliminary deceleration is started after confirming the intention of the driver, the deceleration can be prevented from being started erroneously.

1-1-4-2. Calculation of Initial Solution of Preliminary Deceleration Completion Speed by Initial Deceleration In the step S12, the preliminary deceleration setting unit 54 calculates an initial solution of preliminary deceleration completion speed $V_{1\_ini}$, based on the deceleration point speed $V_2$, the initial deceleration $a_{12\_ini}$ of the final deceleration interval, and the distance $L_{12}$ of the final deceleration interval.

In the present embodiment, the next equation is used. The initial deceleration $a_{12\_ini}$ of the final deceleration interval is preliminarily set considering the vehicle performance and the riding comfort. When the initial solution of preliminary deceleration completion speed $V_{1\_ini}$ set by the equation (2) is larger than the present travelling speed $V_0$, the preliminary deceleration setting unit 54 sets the present travelling speed $V_0$ as the initial solution of preliminary deceleration completion speed $V_{1\_ini}$ ($V_{1\_ini} = V_0$).

[Math. 2]

$$v_{1\_ini} = \sqrt{v_2^2 - 2a_{12\_ini}L_{12}} \quad (2)$$

According to this configuration, the initial solution of preliminary deceleration completion speed $V_{1\_ini}$ that the ego vehicle can reach the deceleration point speed $V_2$ when decelerating at the initial deceleration $a_{12\_ini}$ of the final deceleration interval in the distance $L_{12}$ of the final deceleration interval can be calculated. By appropriate setting of the initial deceleration $a_{12\_ini}$ of the final deceleration interval, stable vehicle behavior and good riding comfort are achieved.

<Calculation of Initial Solution of Distance of Preliminary Deceleration Interval>

In the step S13, the preliminary deceleration setting unit 54 calculates an initial solution of distance $L_{01\_ini}$ of the preliminary deceleration interval, based on the initial solution of preliminary deceleration completion speed $V_{1\_ini}$, the present travelling speed $V_0$, and an initial deceleration $a_{01\_ini}$ of the preliminary deceleration interval.

In the present embodiment, the next equation is used. The initial deceleration $a_{01\_ini}$ of the preliminary deceleration interval is preliminarily set considering the vehicle performance and the riding comfort. An absolute value of the initial deceleration $a_{01\_ini}$ of the preliminary deceleration interval is made smaller than an absolute value of the initial deceleration $a_{12\_ini}$ of the final deceleration interval.

[Math. 3]

$$L_{01\_ini} = \frac{v_1^2 - v_0^2}{2a_{01\_ini}} \quad (3)$$

<Determination of Feasibility of Initial Solution>

In the step S14, the preliminary deceleration setting unit 54 determines whether an initial solution of distance $L_{01\_ini}$ of the preliminary deceleration interval is longer or shorter than the remaining distance $d_1$ from the present position of the ego vehicle to the preliminary deceleration completion point. When determining that it is shorter, it advances to the step S15, and when determining that it is longer, it advances to the step S16.

Figure 7:
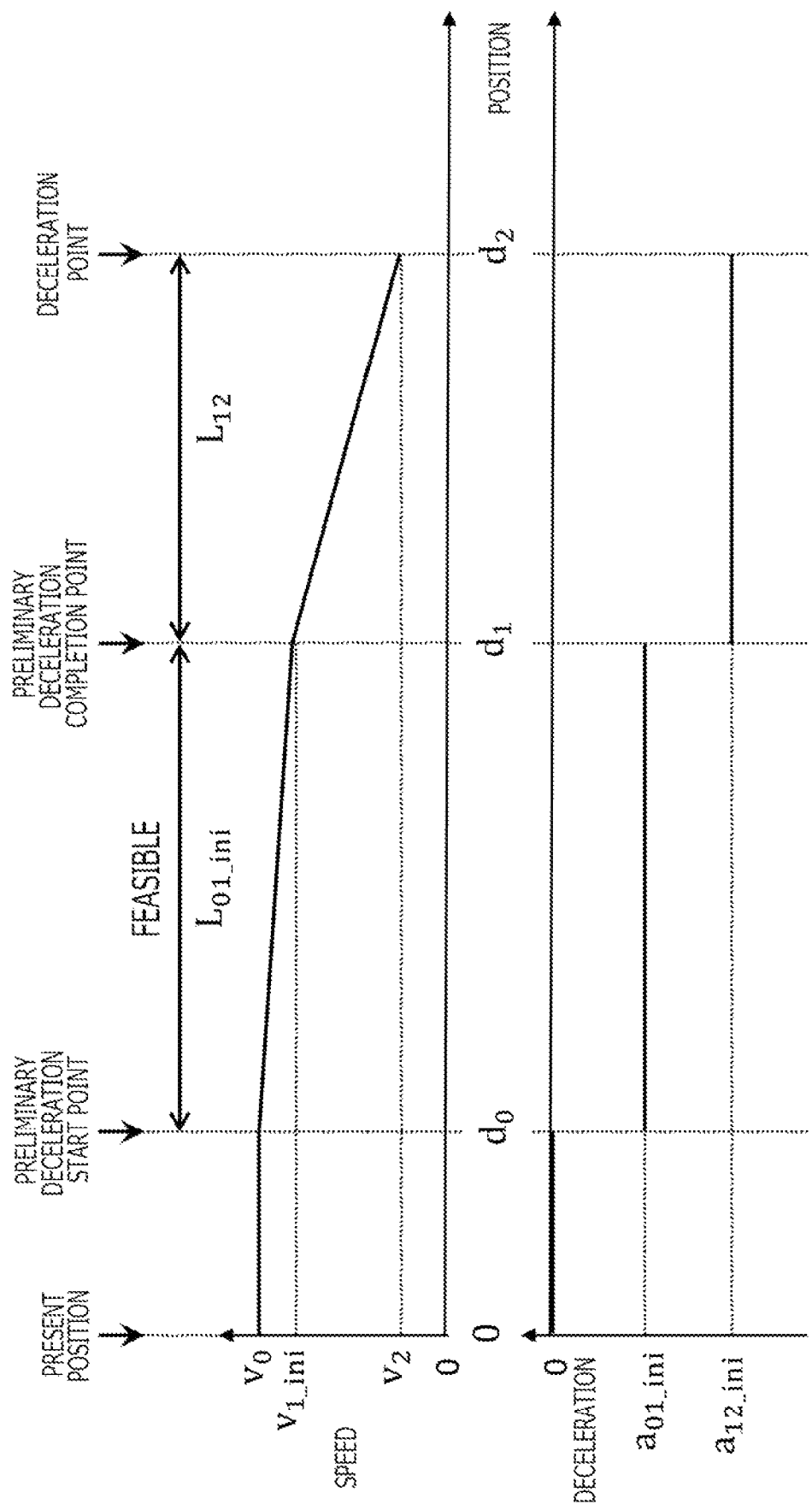
FIG. 7 is a figure for explaining the calculation of the initial solution with feasibility according to Embodiment 1.

For example, in the example of the diversion lane shown in FIG. 7 and FIG. 8, the distance of the final deceleration interval $L_{12}=150$ m, the remaining distance to the preliminary deceleration completion point $d_1=100$ m, the initial deceleration of the final deceleration interval $a_{12\_ini}=-1.0$ m/s², the initial deceleration of the preliminary deceleration interval $a_{01\_ini}=-0.5$ m/s², and the deceleration point speed $V_2=40$ km/h.

In this condition, as schematically shown in FIG. 7, when the present travelling speed $V_0=80$ km/h, the initial solution of preliminary deceleration completion speed $V_{1\_ini}=74.1$ km/h, and the initial solution of distance of the preliminary deceleration interval $L_{01\_ini}=70.4$ m, which is shorter than the remaining distance to the preliminary deceleration completion point $d_1=100$ m, and the initial solution is feasible.

On the other hand, as schematically shown in FIG. 8, when the present travelling speed $V_0=100$ km/h, the initial solution of preliminary deceleration completion speed $V_{1\_ini}=74.1$ km/h, and the initial solution of distance of the preliminary deceleration interval $L_{01\_ini}=348$ m, which is longer than the remaining distance to the preliminary deceleration completion point $d_1=100$ m, and the initial solution is not feasible.

<When Initial Solution is Feasible>

When it is determined that the initial solution of distance $L_{01\_ini}$ of the preliminary deceleration interval is shorter than the remaining distance $d_1$ to the preliminary deceleration completion point, then initial solution of distance $L_{01\_ini}$ of the preliminary deceleration interval can be secured. Accordingly, the ego vehicle can decelerate to the preliminary deceleration completion speed $V_1$ by the initial deceleration $a_{01\_ini}$ of the preliminary deceleration interval, and the ego vehicle can decelerate to the deceleration point speed $V_2$ by the initial deceleration $a_{12\_ini}$ of the final deceleration interval. In this case, in the step S15, the preliminary deceleration setting unit 54 sets the initial solution of preliminary deceleration completion speed $V_{1\_ini}$ as the preliminary deceleration completion speed $V_1$ as it is; sets the initial solution of distance $L_{01\_ini}$ of the preliminary deceleration interval as the distance $L_{01}$ of the preliminary deceleration interval as it is; and sets the start point of the preliminary deceleration to a position before the preliminary deceleration completion point by the distance $L_{01}$ of the preliminary deceleration interval.

According to this configuration, the ego vehicle can decelerate by the preliminarily set initial deceleration $a_{01\_ini}$ of the preliminary deceleration interval in the preliminary deceleration interval, and the ego vehicle can decelerate by the preliminarily set initial deceleration $a_{12\_ini}$ of the final deceleration interval in the final deceleration interval. Accordingly, the preliminarily assumed ideal deceleration can be performed, and stable vehicle behavior and good riding comfort can be realized.

1-1-4-3. Recalculation of Preliminary Deceleration Completion Speed Considered Remaining Distance to Preliminary Deceleration Completion Point On the other hand, when it is determined that the initial solution of distance $L_{01\_ini}$ of the preliminary deceleration interval is longer than the remaining distance $d_1$ to the preliminary deceleration completion point, the initial solution of distance $L_{01\_ini}$ of the preliminary deceleration interval cannot be secured. Accordingly, the ego vehicle cannot decelerate to the initial solution of distance $L_{01\_ini}$ of the preliminary deceleration interval by the initial deceleration $a_{01\_ini}$ of the preliminary deceleration interval, and the ego vehicle cannot decelerate to the deceleration point speed $V_2$ by the initial deceleration $a_{12\_ini}$ of the final deceleration interval. Accordingly, it is necessary to change the deceleration a01 of the preliminary deceleration interval from the initial deceleration $a_{01\_ini}$, and recalculate the preliminary deceleration completion speed $V_1$. Accordingly, processing of step S16 explained in the following is performed.

Hereinafter, the principle of the calculation of the step S16 will be explained. When a preliminary deceleration completion speed after recalculation is defined as $V_1'$, a deceleration after recalculation of the preliminary deceleration interval is defined as $a_{01}'$, and the present position is set as the start point of the preliminary deceleration, the next equation is obtained.

[Math. 4]

$$d_1 = \frac{v_1'^2 - v_0^2}{2a_{01}'} \quad (4)$$

When a deceleration after recalculation of the final deceleration interval is defined as $a_{12}'$ and the distance $L_{12}$ of the final deceleration interval is not changed, the next equation is obtained.

[Math. 5]

$$L_{12} = \frac{v_2^2 - v_1'^2}{2a_{12}'} \quad (5)$$

In order to make an absolute value of the deceleration after recalculation $a_{01}'$ of the preliminary deceleration interval smaller than an absolute value of the deceleration after recalculation $a_{12}'$ of the final deceleration interval, $a_{01}'$ is set like the next equation using a reduction coefficient r. The reduction coefficient r is set to a value less than 1 and larger than 0 (0<r<1). For example, r=0.5 is set.

[Math. 6]

$$a_{01}' = ra_{12}' \quad (6)$$

By substituting mutually so as to eliminate decelerations $a_{12}'$, $a_{01}'$ from the equation (4), the equation (5), and the equation (6), and rearranging for the preliminary deceleration completion speed after recalculation $V_1'$, the next equation is obtained. The equation (7) shows that the preliminary deceleration completion speed $V_1$ can be reset based on the remaining distance $d_1$ from the present position of the ego vehicle to the preliminary deceleration completion point, the distance $L_{12}$ of the final deceleration interval, the present travelling speed $V_0$, and the deceleration point speed $V_2$.

[Math. 7]

$$v_1' = \sqrt{\frac{rd_1 v_2^2 + L_{12} v_0^2}{L_{12} + rd_1}} \quad (7)$$

Then, in the step S16, the preliminary deceleration setting unit 54 calculates the preliminary deceleration completion speed after recalculation $V_1'$, based on the remaining distance $d_1$ from the present position of the ego vehicle to the preliminary deceleration completion point, the distance $L_{12}$ of the final deceleration interval, the present travelling speed $V_0$, and the deceleration point speed $V_2$. In the present embodiment, the equation (7) is used.

Then, the preliminary deceleration setting unit 54 calculates the deceleration after recalculation $a_{01}'$ of the preliminary deceleration interval and the deceleration after recalculation $a_{12}'$ of the final deceleration interval, based on the preliminary deceleration completion speed after recalculation $V_1'$, the present travelling speed $V_0$, and the remaining distance $d_1$ to the preliminary deceleration completion point. In the present embodiment, the equation (8) which deformed the equation (4), and the equation (9) which deformed the equation (6) are used. As mentioned above, the reduction coefficient r is set to a value less than 1 and larger than 0 (0<r<1). For example, r=0.5 is set.

[Math. 8]

$$a_{01}' = \frac{v_1'^2 - v_0^2}{2d_1} \quad (8)$$

[Math. 9]

$$a_{12}' = \frac{1}{r} a_{01}' \quad (9)$$

According to this configuration, while making the absolute value of the deceleration after recalculation $a_{01}'$ of the preliminary deceleration interval smaller than the absolute value of the deceleration after recalculation $a_{12}'$ of the final deceleration interval, based on the remaining distance $d_1$ to the preliminary y deceleration point, completion the preliminary deceleration completion speed after recalculation $V_1'$ which can be achieved before the preliminary deceleration completion point is calculated, and the ego vehicle can be decelerated to the deceleration point speed $V_2$ at the deceleration point.

For example, as FIG. 9 shows a schematic diagram, when the present travelling speed $V_0=100$ km/h, the preliminary deceleration completion speed after recalculation $V_1'=88.8$ km/h, the deceleration after recalculation of the preliminary deceleration interval $a_{01}'=-0.81$ m/s$^2$, and the deceleration after recalculation of the final deceleration interval $a_{12}'=-1.62$ m/s$^2$. Accordingly, when the present travelling speed $V_0$ is high, $V_1'$ is larger than the initial solution of preliminary deceleration completion speed $V_{1\_ini}=74.1$ km/h, and the absolute value of $a_{01}'=-0.81$ m/s$^2$ is larger than the absolute value of the initial solution of deceleration $a_{01\_ini}=-0.5$ m/s$^2$, and the absolute value of $a_{12}'=-1.62$ m/s$^2$ is larger than the absolute value of the initial solution of deceleration of $a_{12\_ini}=-1.0$ m/s$^2$. However, while making the absolute value of the deceleration after recalculation $a_{01}'$ of the preliminary deceleration interval smaller than the absolute value of the deceleration after recalculation $a_{12}'$ of the final deceleration interval, the ego vehicle can be decelerated to the deceleration point speed $V_2$ at the deceleration point.

<Recalculation when Following Vehicle Exists>

When other vehicle exists within a determination range behind the ego vehicle on the lane where the ego vehicle is traveling, the preliminary deceleration setting unit 54 may calculate the preliminary deceleration completion speed after recalculation $V_1'$ which is larger than when other vehicle does not exist. According to this configuration, it can suppress that the preliminary deceleration disturbs the traveling of the following vehicle.

For example, when the ego vehicle is traveling in the main lane, the preliminary deceleration completion point is set after the start point of the diversion lane and the start point of the preliminary deceleration is set in the main lane, this calculation may be performed. It can suppress the disturbance of the traveling of the following vehicle in the main lane.

The determination range is set to 100 m, but it may be changed according to the present travelling speed of the ego vehicle, or the limit speed, for example. In the present embodiment, the preliminary deceleration setting unit 54 makes the reduction coefficient r smaller than when other vehicle does not exist within the determination range behind the ego vehicle. For example, the reduction coefficient r is set to 0.3. Using the small reduction coefficient r, the preliminary deceleration setting unit 54 calculates each calculation value similarly using the equation (7) to the equation (9).

For example, when the present travelling speed $V_0=100$ km/h of FIG. 9, the preliminary deceleration completion speed after calculation $V_1'=92.7$ km/h by setting r=0.3, it is larger than $V_1'=88.8$ km/h when r=0.5, and the uncomfortable feeling of the following vehicle can be reduced. By setting r=0.3, the deceleration after recalculation of the preliminary deceleration interval $a_{01}'=-0.54$ m/s$^2$, and the deceleration after recalculation of the final deceleration interval $a_{12}'=-1.80$ m/s$^2$.

In the equation (7) and the equation (8), the start point of preliminary deceleration is set to the present position of the ego vehicle. But, when the start point of preliminary deceleration is set to after the present position of the ego vehicle, in the equation (7) and the equation (8), instead of the remaining distance $d_1$ to the preliminary deceleration completion point, a distance obtained by subtracting a remaining distance $d_0$ from the present position of the ego vehicle to the start point of preliminary deceleration, from the remaining distance $d_1$ to the preliminary deceleration completion point ($d_1-d_0$, distance $L_{01}$ of the preliminary deceleration interval) may be used.

<Determination of Feasibility of Solution after Recalculation>

In the step S17, the preliminary deceleration setting unit 54 determines whether an absolute value of the deceleration after recalculation $a_{01}'$ of the preliminary deceleration interval is larger or smaller than an upper limit value $Max_{01}$ of the preliminary deceleration interval. When determining that it is smaller, it advances to the step S18, and when determining that it larger, it advances to the step S19. The upper limit value $Max_{01}$ of the preliminary deceleration interval is an upper limit value of the absolute value of the allowable deceleration of the preliminary deceleration interval, and it is preliminarily set considering the vehicle performance and the riding comfort.

When the present travelling speed $V_0=100$ km/h of FIG. 9, the absolute value of the deceleration after recalculation of the preliminary deceleration interval $a_{01}'=-0.81$ m/s$^2$ is less than the upper limit value of the preliminary deceleration interval $Max_{01}=1.0$. Accordingly, even if the ego vehicle decelerates to the preliminary deceleration completion speed after recalculation $V_1'$, there is no problem from the viewpoint of the vehicle performance and the riding comfort.

As schematically shown in FIG. 10, when the present travelling speed $V_0=120$ km/h, the preliminary deceleration completion speed after recalculation $V_1'=105.8$ km/h and the deceleration after recalculation of the preliminary deceleration interval $a_{01}'=-1.23$ m/s$^2$ by calculation of the equation (7) and the equation (8), the absolute value of $a_{01}'$ is larger than the upper limit value $Max_{01}=1.0$ of the preliminary deceleration interval, and it is not desirable from the viewpoint of the vehicle performance and the riding comfort.

<When Solution after Recalculation is Feasible>

When it is determined that the absolute value of deceleration after recalculation $a_{01}'$ of the preliminary deceleration interval is less than the upper limit value $Max_{01}$ of the preliminary deceleration interval, in the step S18, the preliminary deceleration setting unit 54 sets the preliminary deceleration completion speed after recalculation $V_1'$ as the preliminary deceleration completion speed $V_1$; sets the remaining distance $d_1$ to the preliminary deceleration completion point as the distance $L_{01}$ of the preliminary deceleration interval; and sets the present position of the ego vehicle as the start point of the preliminary deceleration.

1-1-4-4. Third time Calculation of Preliminary Deceleration Completion Speed Considering Upper Limit Value of Deceleration of Preliminary Deceleration Interval On the other hand, when it is determined that the absolute value of the deceleration after recalculation $a_{01}'$ of the preliminary deceleration interval is larger than the upper limit value $Max_{01}$ of the preliminary deceleration interval, in the step S19, the preliminary deceleration setting unit 54 calculates a preliminary deceleration completion speed after third time calculation $V_1''$ so that the absolute value of the deceleration $a_{01}$ of the preliminary deceleration interval is the less than or equal to the upper limit value $Max_{01}$ of the preliminary deceleration interval.

In the present embodiment, the preliminary deceleration setting unit 54 calculates a preliminary deceleration completion speed after third time calculation $V_1''$ so that the absolute value of the deceleration $a_{01}$ of the preliminary deceleration interval becomes the upper limit value $\text{Max}_{01}$ of the preliminary deceleration interval.

The equation (10) and the equation (11) are used. That is, the preliminary deceleration setting unit 54 sets a positive and negative reversing value of the upper limit value $\text{Max}_{01}$ of the preliminary deceleration interval as a deceleration after third time calculation $a_{01}''$ of the preliminary deceleration interval. Then, the preliminary deceleration setting unit 54 calculates the preliminary deceleration completion speed after third time calculation $V_1''$, based on the deceleration after third time calculation $a_{01}''$ of the preliminary deceleration interval, the present travelling speed $V_0$, and the remaining distance $d_1$ to the preliminary deceleration completion point.

[Math. 10]
$$a_{01}'' = -\text{Max}_{01} \tag{10}$$

[Math. 11]
$$v_1'' = \sqrt{v_0^2 + 2a_{01}'' d_1} \tag{11}$$

Then, the preliminary deceleration setting unit 54 calculates a deceleration after third time calculation $a_{12}''$ of the final deceleration interval, based on the preliminary deceleration completion speed after third time calculation $V_1''$, the deceleration point speed $V_2$, and the distance $L_{12}$ of the final deceleration interval.

[Math. 12]
$$a_{12}'' = \frac{v_2^2 - v_1''^2}{2L_{12}} \tag{12}$$

The start point of the preliminary deceleration is set to the present position of the ego vehicle in the equation (11). However, when the start point of the preliminary deceleration is set in front of the present position of the ego vehicle, in the equation (11), instead of the remaining distance $d_1$ to the preliminary deceleration completion point, a distance obtained by subtracting the remaining distance $d_0$ from the present position of the ego vehicle to the start point of preliminary deceleration, from the remaining distance $d_1$ to the preliminary deceleration completion point ($d_1-d_0$, distance $L_{01}$ of the preliminary deceleration interval) may be used.

In the step S20, the preliminary deceleration setting unit 54 determines whether the absolute value of the deceleration after third time calculation $a_{12}''$ of the final deceleration interval is larger or smaller than the upper limit value $\text{Max}_{12}$ of the final deceleration interval. When determining that it is smaller, it advances to the step S21, and when determining that it is larger, it advances to the step S22. The upper limit value $\text{Max}_{12}$ of the final deceleration interval is an upper limit value of an absolute value of allowable deceleration of the final deceleration interval, and it is preliminarily set considering the vehicle performance, the riding comfort, and the prevention of rapid approach of the following vehicle.

As schematically shown in FIG. 11, when the present travelling speed $V_0$=120 km/h, the preliminary deceleration completion speed after third time calculation $V_1''$=108.7 km/h, and the deceleration after third time calculation of the final deceleration interval $a_{12}''$=−2.62 m/s² by calculation of the equation (11) and the equation (12), the absolute value of $a_{12}''$ is larger than the upper limit value $\text{Max}_{12}$=2.0 of the final deceleration interval, and it is not desirable from the viewpoint of the vehicle performance, the riding comfort, and the prevention of rapid approach of the following vehicle.

<When Deceleration after Third Time Calculation $a_{12}''$ of Final Deceleration Interval is Feasible>

When it is determined that the absolute value of the deceleration after third time calculation $a_{12}''$ of the final deceleration interval is less than upper limit value $\text{Max}_{12}$ of the final deceleration interval, in the step S21, the preliminary deceleration setting unit 54 sets the preliminary deceleration completion speed after third time calculation $V_1''$ as the preliminary deceleration completion speed $V_1$, sets the remaining distance $d_1$ to the preliminary deceleration completion point as the distance $L_{01}$ of the preliminary deceleration interval; and sets the present position of the ego vehicle as the start point of the preliminary deceleration.

According to this configuration, an appropriate deceleration, considering the vehicle performance, the riding comfort, and the prevention of rapid approach of the following vehicle, which falls within a range of the upper limit value $\text{Max}_{01}$ of the preliminary deceleration interval and the upper limit value $\text{Max}_{12}$ of the final deceleration interval can be performed.

1-1-4-5. Change of Deceleration Point Speed Considering Upper Limit Value of Deceleration of Final Deceleration Interval On the other hand, when it is determined that the absolute value of the deceleration after third time calculation $a_{12}''$ of the final deceleration interval is larger than the upper limit value $\text{Max}_{12}$ of the final deceleration interval, in the step S22, the preliminary deceleration setting unit 54 calculates a deceleration point speed after fourth time calculation $V_2'''$ so that the absolute value of the deceleration $a_{12}$ of the final deceleration interval is less than or equal to the upper limit value $\text{Max}_{12}$ of the final deceleration interval.

In the present embodiment, the preliminary deceleration setting unit 54 calculates the deceleration point speed after fourth time calculation $V_2'''$ so that the absolute value of the deceleration $a_{12}$ of the final deceleration interval becomes the upper limit value $\text{Max}_{12}$ of the final deceleration interval.

The equation (13) and the equation (14) are used. That is, the preliminary deceleration setting unit 54 sets a positive and negative reversing value of the upper limit value $\text{Max}_{12}$ of the final deceleration interval as a deceleration after fourth time calculation $a_{12}'''$ of the final deceleration interval. Then, the preliminary deceleration setting unit 54 calculates the deceleration point speed after fourth time calculation $V_2'''$, based on the deceleration after fourth time calculation $a_{12}'''$ of the final deceleration interval, the preliminary deceleration completion speed after third time calculation $V_1''$, and the distance $L_{12}$ of the final deceleration interval.

[Math. 13]
$$a_{12}''' = -\text{Max}_{12} \tag{13}$$

[Math. 14]
$$v_2''' = \sqrt{v_1''^2 + 2a_{12}''' L_{12}} \tag{14}$$

As schematically shown in FIG. 12, when the present travelling speed $V_0$=120 km/h, the deceleration point speed after fourth time calculation $V_2'''=63.5$ km/h by calculation of the equation (13) and the equation (14).

In the step S23, the deceleration point setting unit 53 changes the deceleration point speed $V_2$ to the deceleration point speed after fourth time calculation $V_2'''$. The preliminary deceleration setting unit 54 sets the preliminary deceleration completion speed after third time calculation $V_1''$ as the preliminary deceleration completion speed $V_1$; sets the remaining distance $d_1$ to the preliminary deceleration completion point as the distance $L_{01}$ of the preliminary deceleration interval; and sets the present position of the ego vehicle as the start point of the preliminary deceleration.

According to this configuration, although the deceleration point speed $V_2$ is larger than the initial value, an appropriate deceleration, considering the vehicle performance, the riding comfort, and the prevention of rapid approach of the following vehicle, which falls within a range of the upper limit value $Max_{01}$ of the preliminary deceleration interval and the upper limit value $Max_{12}$ of the final deceleration interval can be performed.

When the deceleration point is a position before the stop position, such as a stop line or a front vehicle, and the initial deceleration point speed $V_2$ is 0 km/h, the deceleration point setting unit 53 may leave the deceleration point speed $V_2$ at the initial deceleration point speed $V_2$ without changing to the deceleration point speed after fourth time calculation $V_2'''$ in order to avoid surrounding danger. In this case, although a quick stop is performed, the surrounding danger can be avoided.

In the step S24, the deceleration point setting unit 53 determines whether or not the deceleration point speed after fourth time calculation $V_2'''$ exceeds a determination speed Vth. When exceeding, it advances to the step S25, and when not exceeding, the processing is ended. The determination speed Vth is set based on the initial deceleration point speed $V_2$. For example, a value obtained by adding an addition value (for example, 10 km/h) to the initial deceleration point speed $V_2$ is set as the determination speed Vth.

In the step S25, the deceleration point setting unit 53 requires a manual driving to the driver. The deceleration point setting unit 53 requires the manual driving to the driver by the display screen and the loudspeaker. The vehicle control unit 56 described below switches to the manual driving by the driver, when a handle operation, an accelerator pedal operation, or a brake operation by the driver is detected. According to this configuration, when it is not possible to decelerate sufficiently to the deceleration point speed $V_2$, inappropriate automated traveling can be prevented by transferring authority to the driver.

The calculation of the initial solution of preliminary deceleration completion speed $V_{1\_ini}$ from the step S12 to the step S15 may not be performed, but only calculation from the step S16 to the step S25 may be performed. Alternatively, the calculation from the step S12 to the step S15 and from the step S19 to the step S25 may not be performed, but only calculation from the step S16 and the step S18 may be performed. Alternatively, the calculation from the step S12 to the step S18 may not be performed, but only calculation from the step S19 to the step S25 may be performed.

1-1-5. Target Traveling State Setting Unit 55

In the step S05 of FIG. 3, the target traveling state setting unit 55 sets a target traveling state based on the preliminary deceleration start point, the preliminary deceleration completion point, the preliminary deceleration completion speed $V_1$, the deceleration point, and the deceleration point speed $V_2$.

In the present embodiment, the target traveling state setting unit 55 sets, as the target traveling state, a target speed, a target acceleration, a target jerk, and the like at each point on the target travel route. The target traveling state setting unit 55 may change the target traveling state in accordance with a periphery state detected by periphery monitoring apparatus 31 and the like.

1-1-6. Vehicle Control Unit 56

In the step S06 of FIG. 3, the vehicle control unit 56 controls the ego vehicle based on the target traveling state.

In the present embodiment, the vehicle control unit 56 controls the ego vehicle so that the traveling state of the ego vehicle follows the target traveling state. For example, the vehicle control unit 56 calculates a command value of the output of the power machine 8, and a command value of the braking force of the electric brake apparatus 9 such that the travelling speed of the ego vehicle follows the target speed of the corresponding position; and transmits each command value to the power controller and the brake controller.

The power controller controls the output of the power machines 8, such as the internal combustion engine and the motor, according to the command value of the output. The brake controller controls the brake operation of the electric brake apparatus 9 according to the command value of the braking force.

The vehicle control unit 56 may calculate a command value of target steering angle, and an operation command value of the direction indicator according to the target travel route, and transmit each command value to the automatic steering controller and the light controller. The automatic steering controller controls the electric steering apparatus 7 according to the command value of target steering angle. The light controller controls the direction indicator according to the operation command of the direction indicator.

Various kinds of vehicle control methods may be used. Various kinds of vehicle controls, such as an automated driving and a cruise control, may be performed.

On the other hand, the vehicle control unit 56 switches to the manual driving by the driver, when the handle operation, the accelerator pedal operation, or the brake operation by the driver is detected. In this case, the vehicle control unit 56 calculates the command value of target steering angle, the command value of the output of the power machine 8, and the command value of the braking force of the electric brake apparatus 9, based on the handle operation, the accelerator pedal operation, and the brake operation by the driver, and transmits to each controller.

<Summary of Aspects of the Present Disclosure>

Hereinafter, the aspects of the present disclosure is summarized as appendixes.

APPENDIX 1

A vehicle control apparatus comprising:

an information acquisition unit that acquires a traveling state of an ego vehicle, and road information around the ego vehicle;

a target travel route setting unit that sets a target travel route of the ego vehicle;

a deceleration point setting unit that sets a deceleration point which is a point where a speed at which the ego vehicle should travel is less than a present travelling speed of the ego vehicle, on the target travel route, based on the traveling state, the target travel route, and the road information, and sets a deceleration point speed which is a speed at which the ego vehicle should travel at the deceleration point;

a preliminary deceleration setting unit that sets a preliminary deceleration completion point which is a point where a preliminary deceleration of the ego vehicle is completed between the present position of the ego vehicle and the deceleration point, on the target travel route; and sets a preliminary deceleration completion speed which is a speed at which the ego vehicle should travel at the preliminary deceleration completion point;

a target traveling state setting unit that sets a target traveling state based on the preliminary deceleration completion point, the preliminary deceleration completion speed, the deceleration point, and the deceleration point speed; and a vehicle control unit that controls the ego vehicle based on the target traveling state, wherein the preliminary deceleration setting unit sets the preliminary deceleration completion point and the preliminary deceleration completion speed so that an absolute value of a deceleration of a preliminary deceleration interval from a start point of the preliminary deceleration to the preliminary deceleration completion point is smaller than an absolute value of a deceleration f a final deceleration interval from the preliminary deceleration completion point to the deceleration point.

APPENDIX 2

The vehicle control apparatus according to Appendix 1,
wherein the preliminary deceleration setting unit sets the preliminary deceleration completion speed, based on a remaining distance from the present position of the ego vehicle to the preliminary deceleration completion point, a distance of the final deceleration interval, the present travelling speed, and the deceleration point speed.

APPENDIX 3

The vehicle control apparatus according to Appendix 1 or 2,
wherein, when a diversion lane diverged from a main lane exists on the target travel route, the preliminary deceleration setting unit sets the preliminary deceleration completion point after a start point of the diversion lane.

APPENDIX 4

The vehicle control apparatus according to any one of Appendixes 1 to 3,
wherein the information acquisition unit acquires information on other vehicle around the ego vehicle, and
wherein, when other vehicle exists within a determination range behind the ego vehicle on a lane where the ego vehicle is traveling, the preliminary deceleration setting unit sets the preliminary deceleration completion speed which is larger than when other vehicle does not exist.

APPENDIX 5

The vehicle control apparatus according to any one of Appendixes 1 to 4,
wherein the deceleration point setting unit set, as the deceleration point, a position of a limit speed sign which starts an interval of a limit speed lower than the present travelling speed of the ego vehicle, on the target travel route; and sets the deceleration point speed based on the limit speed of the limit speed sign.

APPENDIX 6

The vehicle control apparatus according to any one of Appendixes 1 to 4,
wherein, when a tollgate which requires deceleration exists on the target travel route, the deceleration point setting unit sets an entrance of the tollgate as the deceleration point; and sets a passing speed of the tollgate as the deceleration point speed.

APPENDIX 7

The vehicle control apparatus according to any one of Appendixes 1 to 6,
wherein, when an operation of a direction indicator by a driver is detected in a case where a lane change is required in an interval before reaching at the deceleration point, the preliminary deceleration setting unit sets the preliminary deceleration completion point and the preliminary deceleration completion speed, and starts the preliminary deceleration.

APPENDIX 8

The vehicle control apparatus according to any one of Appendixes 1 to 7,
wherein the preliminary deceleration setting unit sets the preliminary deceleration completion speed so that the absolute value of the deceleration of the preliminary deceleration interval is less than or equal to an upper limit value of the preliminary deceleration interval.

APPENDIX 9

The vehicle control apparatus according to any one of Appendixes 1 to 8,
wherein the deceleration point setting unit sets the deceleration point speed so that the absolute value of the deceleration of the final deceleration interval is less than or equal to an upper limit value of the final deceleration interval.

APPENDIX 10

The vehicle control apparatus according to Appendix 9,
wherein, when the deceleration point speed exceeds a determination speed, the deceleration point setting unit requires a manual driving to a driver.

APPENDIX 11

The vehicle control apparatus according to Appendix 1,
wherein the preliminary deceleration setting unit calculates an initial solution of preliminary deceleration completion speed, based on the deceleration point speed, an initial deceleration of the final deceleration interval, and a distance of the final deceleration interval; calculates an initial solution of distance of the preliminary deceleration interval, based on the initial solution of preliminary deceleration completion speed, the present travelling speed, and the initial deceleration of the preliminary deceleration interval; determines whether the initial solution of distance of the preliminary deceleration interval is longer or shorter than a remaining distance from the present position of the ego vehicle to the preliminary deceleration completion point;

when determining that it is shorter, sets the initial solution of preliminary deceleration completion speed as the preliminary deceleration completion speed;

when determining that it is longer, calculates a preliminary deceleration completion speed after recalculation, based on the remaining distance to the preliminary deceleration completion point, the distance of the final deceleration interval, the present travelling speed, and the deceleration point speed;

calculates a deceleration after recalculation of the preliminary deceleration interval, based on the preliminary deceleration completion speed after recalculation, the present travelling speed, and the remaining distance to the preliminary value of the deceleration after recalculation of the preliminary deceleration interval is larger or smaller than an upper limit value of the preliminary deceleration interval;

when determining that it is smaller, sets the preliminary deceleration completion speed after recalculation as the preliminary deceleration completion speed; and when determining that it is larger, calculates a preliminary deceleration completion speed after third time calculation so that the absolute value of the deceleration of the preliminary deceleration interval is less than or equal to the upper limit value of the preliminary deceleration interval, and sets the preliminary deceleration completion speed after third time calculation as the preliminary deceleration completion speed.

APPENDIX 12

The vehicle control apparatus according to Appendix 11,
wherein the preliminary deceleration setting unit calculates a deceleration after third time calculation of the final deceleration interval, based on the preliminary deceleration completion speed after third time calculation, the deceleration point speed, and the distance of the final deceleration interval; determines whether an absolute value of the deceleration after third time calculation of the final deceleration interval is larger or smaller than an upper limit value of the final deceleration interval; and when determining that it is larger, calculates a deceleration point speed after fourth time calculation so that the absolute value of the deceleration of the final deceleration interval is less than or equal to the upper limit value of the final deceleration interval, and wherein the deceleration point setting unit changes the deceleration point speed to the deceleration point speed after fourth time calculation.

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A vehicle control apparatus comprising at least one processor configured to implement:

an information acquisitor that acquires a traveling state of an ego vehicle, and road information around the ego vehicle;

a target travel route setter that sets a target travel route of the ego vehicle;

a deceleration point setter that sets a deceleration point which is a point where a speed at which the ego vehicle should travel is less than a present travelling speed of the ego vehicle, on the target travel route, based on the traveling state, the target travel route, and the road information, and sets a deceleration point speed which is a speed at which the ego vehicle should travel at the deceleration point;

a preliminary deceleration setter that sets a preliminary deceleration completion point which is a point where a preliminary deceleration of the ego vehicle is completed between the present position of the ego vehicle and the deceleration point, on the target travel route; and sets a preliminary deceleration completion speed which is a speed at which the ego vehicle should travel at the preliminary deceleration completion point;

a target traveling state setter that sets a target traveling state based on the preliminary deceleration completion point, the preliminary deceleration completion speed, the deceleration point, and the deceleration point speed; and a vehicle controller that controls the ego vehicle based on the target traveling state, wherein the preliminary deceleration setter sets the preliminary deceleration completion point and the preliminary deceleration completion speed so that an absolute value of a deceleration of a preliminary deceleration interval from a start point of the preliminary deceleration to the preliminary deceleration completion point is smaller than an absolute value of a deceleration of a final deceleration interval from the preliminary deceleration completion point to the deceleration point.

2. The vehicle control apparatus according to claim 1, wherein the preliminary deceleration setter sets the preliminary deceleration completion speed, based on a remaining distance from the present position of the ego vehicle to the preliminary deceleration completion point, a distance of the final deceleration interval, the present travelling speed, and the deceleration point speed.

3. The vehicle control apparatus according to claim 1, wherein, when a diversion lane diverged from a main lane exists on the target travel route, the preliminary deceleration setter sets the preliminary deceleration completion point after a start point of the diversion lane.

4. The vehicle control apparatus according to claim 1, wherein the information acquisitor acquires information on other vehicle around the ego vehicle, and wherein, when other vehicle exists within a determination range behind the ego vehicle on a lane where the ego vehicle is traveling, the preliminary deceleration setter sets the preliminary deceleration completion speed which is larger than when other vehicle does not exist.

5. The vehicle control apparatus according to claim 1, wherein the deceleration point setter set, as the deceleration point, a position of a limit speed sign which starts an interval of a limit speed lower than the present travelling speed of the ego vehicle, on the target travel route; and sets the deceleration point speed based on the limit speed of the limit speed sign.

6. The vehicle control apparatus according to claim 1, wherein, when a tollgate which requires deceleration exists on the target travel route, the deceleration point setter sets an entrance of the tollgate as the deceleration point; and sets a passing speed of the tollgate as the deceleration point speed.

7. The vehicle control apparatus according to claim 1, wherein, when an operation of a direction indicator by a driver is detected in a case where a lane change is required in an interval before reaching at the deceleration point, the preliminary deceleration setter sets the preliminary deceleration completion point and the preliminary deceleration completion speed, and starts the preliminary deceleration.

8. The vehicle control apparatus according to claim 1, wherein the preliminary deceleration setter sets the preliminary deceleration completion speed so that the absolute value of the deceleration of the preliminary deceleration interval is less than or equal to an upper limit value of the preliminary deceleration interval.

9. The vehicle control apparatus according to claim 1, wherein the deceleration point setter sets the deceleration point speed so that the absolute value of the deceleration of the final deceleration interval is less than or equal to an upper limit value of the final deceleration interval.

10. The vehicle control apparatus according to claim 9, wherein, when the deceleration point speed exceeds a determination speed, the deceleration point setter requires a manual driving to a driver.

11. The vehicle control apparatus according to claim 1, wherein the preliminary deceleration setter calculates an initial solution of preliminary deceleration completion speed, based on the deceleration point speed, an initial deceleration of the final deceleration interval, and a distance of the final deceleration interval; calculates an initial solution of distance of the preliminary deceleration interval, based on the initial solution of preliminary deceleration completion speed, the present travelling speed, and the initial deceleration of the preliminary deceleration interval; determines whether the initial solution of distance of the preliminary deceleration interval is longer or shorter than a remaining distance from the present position of the ego vehicle to the preliminary deceleration completion point;

when determining that it is shorter, sets the initial solution of preliminary deceleration completion speed as the preliminary deceleration completion speed;

when determining that it is longer, calculates a preliminary deceleration completion speed after recalculation, based on the remaining distance to the preliminary deceleration completion point, the distance of the final deceleration interval, the present travelling speed, and the deceleration point speed;

calculates a deceleration after recalculation of the preliminary deceleration interval, based on the preliminary deceleration completion speed after recalculation, the present travelling speed, and the remaining distance to the preliminary value of the deceleration after recalculation of the preliminary deceleration interval is larger or smaller than an upper limit value of the preliminary deceleration interval;

when determining that it is smaller, sets the preliminary deceleration completion speed after recalculation as the preliminary deceleration completion speed; and when determining that it is larger, calculates a preliminary deceleration completion speed after third time calculation so that the absolute value of the deceleration of the preliminary deceleration interval is less than or equal to the upper limit value of the preliminary deceleration interval, and sets the preliminary deceleration completion speed after third time calculation as the preliminary deceleration completion speed.

12. The vehicle control apparatus according to claim 11, wherein the preliminary deceleration setter calculates a deceleration after third time calculation of the final deceleration interval, based on the preliminary deceleration completion speed after third time calculation, the deceleration point speed, and the distance of the final deceleration interval; determines whether an absolute value of the deceleration after third time calculation of the final deceleration interval is larger or smaller than an upper limit value of the final deceleration interval; and when determining that it is larger, calculates a deceleration point speed after fourth time calculation so that the absolute value of the deceleration of the final deceleration interval is less than or equal to the upper limit value of the final deceleration interval, and wherein the deceleration point setter changes the deceleration point speed to the deceleration point speed after fourth time calculation.

\* \* \* \* \*